(12) United States Patent
Liu

(10) Patent No.: US 8,262,774 B2
(45) Date of Patent: Sep. 11, 2012

(54) AIR COLLECTOR WITH FUNCTIONALIZED ION EXCHANGE MEMBRANE FOR CAPTURING AMBIENT $CO_2$

(75) Inventor: Ping Liu, Tucson, AZ (US)

(73) Assignee: Kilimanjaro Energy, Inc., San Francisco, CA (US)

(*) Notice: Subject to any disclaimer, the term of this patent is extended or adjusted under 35 U.S.C. 154(b) by 769 days.

(21) Appl. No.: 12/274,986

(22) Filed: Nov. 20, 2008

(65) Prior Publication Data

US 2009/0130321 A1    May 21, 2009

Related U.S. Application Data

(60) Provisional application No. 60/989,405, filed on Nov. 20, 2007, provisional application No. 61/058,876, filed on Jun. 4, 2008, provisional application No. 61/080,110, filed on Jul. 11, 2008.

(51) Int. Cl.
  *B01D 53/02* (2006.01)
(52) U.S. Cl. ................. 95/139; 95/92; 95/143
(58) Field of Classification Search .............. 95/92, 139, 95/143
  See application file for complete search history.

(56) References Cited

U.S. PATENT DOCUMENTS

| | | | |
|---|---|---|---|
| 1,031,799 A | 7/1912 | MacKay | |
| 1,296,889 A | 3/1919 | White | 100/187 |
| 1,482,367 A | 1/1924 | Elledge | |
| 2,718,454 A | 9/1955 | Wylie | 423/229 |
| 2,796,145 A | 6/1957 | King | 96/262 |
| 2,922,489 A | 1/1960 | Lee | |
| 3,024,207 A | 3/1962 | Shaw et al. | 521/28 |
| 3,063,195 A | 11/1962 | Ravich | 47/17 |
| 3,318,588 A | 5/1967 | Russell et al. | 261/153 |
| 3,330,750 A | 7/1967 | McRae et al. | 204/524 |
| 3,344,050 A | 9/1967 | Bertrand et al. | 205/555 |
| 3,466,019 A | 9/1969 | Priestley | |
| 3,466,138 A | 9/1969 | Spiegler et al. | 23/2 |
| 3,489,506 A | 1/1970 | Galstaun et al. | 423/233 |

(Continued)

FOREIGN PATENT DOCUMENTS

CA      1 212 522      10/1986

(Continued)

OTHER PUBLICATIONS

"Extraction of Carbon Dioxide from the Atmosphere Through Engineered Chimical Sinkage", Dubey et al., Fuel Chemistry Division Preprints, 2001, pp. 1-4.

(Continued)

*Primary Examiner* — Gregory Webb
(74) *Attorney, Agent, or Firm* — Wilson Sonsini Goodrich & Rosati

(57) ABSTRACT

Disclosed is a process for forming a $CO_2$ capture element comprises providing a mixture of a monomer or monomer blend or a polymer binder, a miscible liquid carrier for the binder and a $CO_2$ sorbent or getter in particle form, forming the mixture into a wet film or membrane, evaporating the liquid carrier to form a film or membrane, and treating the wet film or membrane to form pores in the body of the film or membrane. Also disclosed is a process of forming a $CO_2$ capture element which comprises the steps of applying a mixture including a sorbent material and a polymer to an underlying material; polymerizing the mixture in place on the material; and aminating the polymer-coated material.

9 Claims, 9 Drawing Sheets

U.S. PATENT DOCUMENTS

| | | | | |
|---|---|---|---|---|
| 3,498,026 | A | 3/1970 | Messinger et al. | 55/73 |
| 3,554,691 | A | 1/1971 | Kuo et al. | |
| 3,594,989 | A | 7/1971 | Bastiaans | 55/142 |
| 3,627,478 | A | 12/1971 | Tepper | 423/230 |
| 3,627,703 | A | 12/1971 | Kojima | 260/2.1 |
| 3,645,072 | A | 2/1972 | Clapham | 55/387 |
| 3,691,109 | A | 9/1972 | Larsen | 260/2.1 R |
| 3,710,778 | A | 1/1973 | Cornelius | 128/2 |
| 3,712,025 | A | 1/1973 | Wallace | 55/2 |
| 3,727,375 | A | 4/1973 | Wallace | 55/2 |
| 3,833,710 | A | 9/1974 | Deschamps et al. | 423/573 |
| 3,865,924 | A | 2/1975 | Gidaspow et al. | 423/230 |
| 3,876,565 | A | 4/1975 | Takashima et al. | 260/2.1 |
| 3,876,738 | A | 4/1975 | Marinaccio et al. | 264/41 |
| 3,907,967 | A | 9/1975 | Filss | 423/210 |
| 3,915,822 | A | 10/1975 | Veltman | 204/151 |
| 3,948,627 | A | 4/1976 | Schwarz et al. | 55/230 |
| 3,981,698 | A | 9/1976 | Leppard | 55/31 |
| 4,012,206 | A | 3/1977 | Macriss et al. | 55/34 |
| 4,047,894 | A | 9/1977 | Kuhl | 23/284 |
| 4,167,551 | A | 9/1979 | Tamura et al. | 521/27 |
| 4,197,421 | A | 4/1980 | Steinberg | 585/733 |
| 4,238,305 | A | 12/1980 | Gancy et al. | 204/180 |
| 4,239,515 | A | 12/1980 | Yanagioka et al. | 55/223 |
| 4,246,241 | A | 1/1981 | Mathur et al. | 423/179 |
| 4,296,050 | A | 10/1981 | Meier | 261/112.2 |
| 4,321,410 | A | 3/1982 | Ono et al. | |
| 4,340,480 | A | 7/1982 | Pall et al. | 210/490 |
| 4,436,707 | A | 3/1984 | Karwat | 423/226 |
| 4,475,448 | A | 10/1984 | Shoaf et al. | 99/323.1 |
| 4,497,641 | A | 2/1985 | Brown, Jr. et al. | 55/240 |
| 4,511,375 | A | 4/1985 | BeVier | 55/28 |
| 4,528,248 | A | 7/1985 | Galbraith et al. | 429/8 |
| 4,566,221 | A | 1/1986 | Kossin | 47/41.12 |
| 4,592,817 | A | 6/1986 | Chlanda et al. | 204/534 |
| 4,594,081 | A | 6/1986 | Kroll et al. | 96/235 |
| 4,608,140 | A | 8/1986 | Goldstein | 435/173.9 |
| 4,678,648 | A | 7/1987 | Wynn | 423/228 |
| 4,711,645 | A | 12/1987 | Kumar | 55/26 |
| 4,729,883 | A | 3/1988 | Lam et al. | 423/228 |
| 4,770,777 | A | 9/1988 | Steadly et al. | 210/490 |
| 4,804,522 | A | 2/1989 | Hass | 423/235 |
| 4,810,266 | A | 3/1989 | Zinnen et al. | 55/68 |
| 4,861,360 | A | 8/1989 | Apffel | 62/17 |
| 4,869,894 | A | 9/1989 | Wang et al. | 423/650 |
| 4,899,544 | A | 2/1990 | Boyd | 60/618 |
| 4,906,263 | A | 3/1990 | Von Blucher et al. | 96/135 |
| 4,941,898 | A | 7/1990 | Kimura | 96/282 |
| 4,957,519 | A | 9/1990 | Chen | |
| 4,980,098 | A | 12/1990 | Connery | |
| 5,069,688 | A | 12/1991 | Wells | |
| 5,070,664 | A | 12/1991 | Groh et al. | 52/177 |
| 5,180,750 | A | 1/1993 | Sugaya et al. | 521/32 |
| 5,215,662 | A | 6/1993 | Johnson et al. | 210/500.38 |
| 5,277,915 | A | 1/1994 | Provonchee et al. | 424/485 |
| 5,281,254 | A | 1/1994 | Birbara et al. | 95/44 |
| 5,308,466 | A | 5/1994 | Ganzi et al. | 204/151 |
| 5,316,637 | A | 5/1994 | Ganzi et al. | 204/182.4 |
| 5,318,758 | A | 6/1994 | Fujii et al. | 423/228 |
| 5,328,851 | A | 7/1994 | Zaromb | |
| 5,344,627 | A | 9/1994 | Fujii et al. | 423/220 |
| 5,385,610 | A | 1/1995 | Deerer et al. | 118/241 |
| 5,389,257 | A | 2/1995 | Todd et al. | 210/602 |
| 5,414,957 | A | 5/1995 | Kenney | 47/12.12 |
| 5,454,189 | A | 10/1995 | Graham et al. | 47/41.12 |
| 5,525,237 | A | 6/1996 | Birbara et al. | 210/670 |
| 5,535,989 | A | 7/1996 | Sen | 261/112.1 |
| 5,658,372 | A | 8/1997 | Gadkaree | 95/116 |
| 5,682,709 | A | 11/1997 | Erickson | 47/58.1 R |
| 5,711,770 | A | 1/1998 | Malina | 48/197 R |
| 5,756,207 | A | 5/1998 | Clough et al. | 428/375 |
| 5,779,767 | A | 7/1998 | Golden et al. | 95/96 |
| 5,788,826 | A | 8/1998 | Nyberg | 204/536 |
| 5,797,979 | A | 8/1998 | Quinn | 95/97 |
| 5,876,488 | A | 3/1999 | Birbara et al. | 95/139 |
| 5,887,547 | A | 3/1999 | Caveny et al. | 119/174 |
| 5,914,455 | A | 6/1999 | Jain et al. | 95/96 |
| 5,917,136 | A | 6/1999 | Gaffney et al. | 95/98 |
| 5,934,379 | A | 8/1999 | Ostlyngen et al. | 169/46 |
| 5,955,043 | A | 9/1999 | Neuman et al. | 423/206.2 |
| 5,972,080 | A | 10/1999 | Nagata | 96/13 |
| 5,980,611 | A | 11/1999 | Kumar et al. | 95/101 |
| 6,004,381 | A | 12/1999 | Rohrbach et al. | 95/211 |
| 6,027,552 | A | 2/2000 | Ruck et al. | |
| 6,083,740 | A | 7/2000 | Kodo et al. | 435/266 |
| 6,117,404 | A | 9/2000 | Mimura et al. | 423/228 |
| 6,136,075 | A | 10/2000 | Bragg et al. | 96/135 |
| 6,180,012 | B1 | 1/2001 | Rongved | 210/717 |
| 6,221,225 | B1 | 4/2001 | Mani | 204/523 |
| 6,228,145 | B1 | 5/2001 | Falk-Pedersen et al. | 95/44 |
| 6,237,284 | B1 | 5/2001 | Erickson | 47/58.1 R |
| 6,279,576 | B1 | 8/2001 | Lambert | 128/205.28 |
| 6,306,803 | B1 | 10/2001 | Tazaki | 508/539 |
| 6,316,668 | B1 | 11/2001 | King et al. | 562/580 |
| 6,334,886 | B1 | 1/2002 | Barnes, Jr. et al. | 95/181 |
| 6,364,938 | B1 | 4/2002 | Birbara et al. | 95/139 |
| 6,402,819 | B1 | 6/2002 | De Ruiter et al. | 96/153 |
| 6,503,957 | B1 | 1/2003 | Bernatowicz et al. | 521/27 |
| 6,547,854 | B1 | 4/2003 | Gray et al. | 95/139 |
| 6,582,498 | B1 | 6/2003 | Sass et al. | 95/211 |
| 6,617,014 | B1 | 9/2003 | Thomson | 428/304.4 |
| 6,632,848 | B2 | 10/2003 | Sugaya | |
| 6,645,272 | B2 | 11/2003 | Lemaire et al. | 95/174 |
| 6,716,888 | B2 | 4/2004 | Bernatowicz et al. | 521/27 |
| 6,755,892 | B2 | 6/2004 | Nalette et al. | 95/139 |
| 6,830,596 | B1 | 12/2004 | Hershkowitz et al. | |
| 6,863,713 | B1 | 3/2005 | Ghosal et al. | 95/117 |
| 6,890,497 | B2 | 5/2005 | Rau et al. | 423/220 |
| 6,908,497 | B1 | 6/2005 | Sirwardane | 95/136 |
| 6,969,466 | B1 | 11/2005 | Starner | 210/663 |
| 7,067,456 | B2 | 6/2006 | Fan et al. | 502/400 |
| 7,132,090 | B2 | 11/2006 | Dziedzic et al. | 423/230 |
| 7,270,796 | B2 | 9/2007 | Kemp et al. | 423/549 |
| 7,343,341 | B2 | 3/2008 | Sandor et al. | 705/37 |
| 7,364,608 | B2 | 4/2008 | Tanahashi et al. | 96/108 |
| 7,384,621 | B2 | 6/2008 | Stevens et al. | 423/650 |
| 7,415,418 | B2 | 8/2008 | Zimmerman | 705/1 |
| 7,420,004 | B2 | 9/2008 | Hardy et al. | 518/704 |
| 7,655,069 | B2 | 2/2010 | Wright et al. | 95/92 |
| 7,699,909 | B2 | 4/2010 | Lackner et al. | |
| 7,708,806 | B2 | 5/2010 | Wright et al. | 95/139 |
| 7,776,296 | B2 * | 8/2010 | Sarlis | 423/229 |
| 7,833,328 | B2 | 11/2010 | Lackner et al. | |
| 7,993,432 | B2 | 8/2011 | Wright et al. | 95/139 |
| 8,133,305 | B2 | 3/2012 | Lackner et al. | |
| 2001/0004895 | A1 | 6/2001 | Preiss | 128/205.28 |
| 2001/0009124 | A1 | 7/2001 | Suzuki et al. | 95/113 |
| 2001/0022952 | A1 | 9/2001 | Rau et al. | 422/169 |
| 2002/0083833 | A1 | 7/2002 | Nalette et al. | 95/139 |
| 2002/0102674 | A1 | 8/2002 | Anderson | 435/174 |
| 2002/0178925 | A1 | 12/2002 | Mimura et al. | 96/299 |
| 2003/0022948 | A1 | 1/2003 | Seiki et al. | 518/704 |
| 2003/0145726 | A1 | 8/2003 | Gueret et al. | 95/96 |
| 2003/0167692 | A1 | 9/2003 | Jewell et al. | 48/197 |
| 2003/0205692 | A1 | 11/2003 | Fleming et al. | 252/70 |
| 2003/0220188 | A1 | 11/2003 | Marand et al. | 502/60 |
| 2004/0031424 | A1 | 2/2004 | Pope | 110/230 |
| 2004/0069144 | A1 | 4/2004 | Wegeng et al. | 95/106 |
| 2004/0103831 | A1 | 6/2004 | Pope | 110/341 |
| 2004/0134353 | A1 | 7/2004 | Gillingham et al. | 95/273 |
| 2004/0195115 | A1 | 10/2004 | Colombo | 206/204 |
| 2004/0213705 | A1 | 10/2004 | Blencoe et al. | 422/129 |
| 2004/0219090 | A1 | 11/2004 | Dziedzic et al. | 423/437.1 |
| 2005/0011770 | A1 | 1/2005 | Katsuyoshi et al. | 205/742 |
| 2005/0063956 | A1 | 3/2005 | Bernklau et al. | 424/93.4 |
| 2005/0092176 | A1 | 5/2005 | Ding et al. | 95/90 |
| 2005/0095486 | A1 | 5/2005 | Hamamoto et al. | |
| 2005/0204915 | A1 | 9/2005 | Sammons et al. | 95/45 |
| 2005/0252215 | A1 | 11/2005 | Beaumont | 60/753 |
| 2005/0269094 | A1 | 12/2005 | Harris | 166/302 |
| 2005/0279095 | A1 | 12/2005 | Goldman | 60/641.8 |
| 2006/0013963 | A1 | 1/2006 | Thomson | 427/487 |
| 2006/0042209 | A1 | 3/2006 | Dallas et al. | 55/524 |
| 2006/0051274 | A1 | 3/2006 | Wright et al. | 423/220 |
| 2006/0186562 | A1 | 8/2006 | Wright et al. | 261/94 |
| 2006/0249020 | A1 | 11/2006 | Tonkovich et al. | 95/115 |
| 2006/0289003 | A1 | 12/2006 | Lackner et al. | 128/200.24 |

| | | | |
|---|---|---|---|
| 2007/0004023 A1* | 1/2007 | Trachtenberg | 435/266 |
| 2007/0089605 A1 | 4/2007 | Lampinen | 95/139 |
| 2007/0149398 A1 | 6/2007 | Jones et al. | 502/402 |
| 2007/0187247 A1 | 8/2007 | Lackner et al. | 204/518 |
| 2007/0199448 A1 | 8/2007 | Yates et al. | 95/139 |
| 2007/0217982 A1* | 9/2007 | Wright et al. | 423/230 |
| 2008/0008793 A1 | 1/2008 | Forsyth et al. | 426/118 |
| 2008/0025893 A1 | 1/2008 | Asprion et al. | 423/228 |
| 2008/0031801 A1 | 2/2008 | Lackner et al. | 423/438 |
| 2008/0087165 A1 | 4/2008 | Wright et al. | 95/51 |
| 2008/0293976 A1 | 11/2008 | Olah et al. | 95/139 |
| 2009/0120288 A1 | 5/2009 | Lackner et al. | 95/68 |
| 2009/0232861 A1 | 9/2009 | Wright et al. | 424/405 |
| 2009/0294366 A1 | 12/2009 | Wright et al. | 210/683 |
| 2010/0095842 A1 | 4/2010 | Lackner et al. | |
| 2010/0105126 A1 | 4/2010 | Wright et al. | 435/257.1 |
| 2010/0116137 A1 | 5/2010 | Wright et al. | |
| 2010/0319537 A1 | 12/2010 | Eisenberger et al. | 95/139 |
| 2011/0027157 A1 | 2/2011 | Wright et al. | |
| 2011/0033357 A1 | 2/2011 | Wright et al. | |
| 2011/0033358 A1 | 2/2011 | Wright et al. | |
| 2011/0056382 A1 | 3/2011 | Lackner et al. | |
| 2011/0079144 A1 | 4/2011 | Wright et al. | |
| 2011/0079146 A1 | 4/2011 | Wright et al. | |
| 2011/0079147 A1 | 4/2011 | Wright et al. | |
| 2011/0081709 A1 | 4/2011 | Wright et al. | |
| 2011/0081710 A1 | 4/2011 | Wright et al. | |
| 2011/0083554 A1 | 4/2011 | Wright et al. | |
| 2011/0108421 A1 | 5/2011 | Lackner et al. | |
| 2011/0185897 A1 | 8/2011 | Wright et al. | |
| 2011/0189075 A1 | 8/2011 | Wright et al. | |
| 2011/0203174 A1 | 8/2011 | Lackner et al. | |
| 2011/0203311 A1 | 8/2011 | Wright et al. | |
| 2011/0206588 A1 | 8/2011 | Lackner et al. | |
| 2011/0209614 A1 | 9/2011 | Wright et al. | |
| 2011/0293503 A1 | 12/2011 | Wright et al. | |
| 2012/0058032 A1 | 3/2012 | Lackner et al. | |

FOREIGN PATENT DOCUMENTS

| | | | |
|---|---|---|---|
| CA | 1 236 877 | 5/1988 | |
| DE | 4 130 837 | 4/1992 | |
| DE | 195 21 678 | 6/1995 | |
| DE | 19521678 | 6/1995 | |
| DE | 195 21 678 | 12/1996 | |
| DE | 197 27 295 | 1/1999 | |
| DE | 198 30 470 | 11/1999 | |
| DE | 20001385 | 1/2000 | |
| DE | 200 01 385 | 8/2000 | |
| EP | 0020055 | 5/1980 | |
| EP | 0 020 055 | 12/1980 | |
| EP | 0111911 | 6/1984 | 95/139 |
| EP | 0 254 137 | 1/1988 | |
| EP | 0254137 | 1/1988 | |
| EP | 0 585 898 | 9/1994 | |
| FR | 2029424 | 10/1970 | |
| GB | 1 031 799 | 2/1963 | |
| GB | 1 004 046 | 9/1965 | |
| GB | 1 031 799 | 6/1966 | |
| GB | 1109439 | 4/1968 | |
| GB | 1 204 781 | 9/1970 | |
| GB | 1296889 | 11/1972 | |
| GB | 1 520 110 | 10/1974 | |
| JP | 58-122022 | 7/1983 | |
| JP | 61 72 035 | 4/1986 | |
| JP | 61 072 035 | 4/1986 | |
| JP | 61 227822 A | 10/1986 | |
| JP | 61-254221 | 11/1986 | |
| JP | 61-280217 | 12/1986 | |
| JP | 63 12323 | 1/1988 | |
| JP | 63 12324 | 1/1988 | |
| JP | 63-016032 | 1/1988 | |
| JP | 63012323 | 1/1988 | |
| JP | 63012324 | 1/1988 | |
| JP | 63-69525 | 3/1988 | |
| JP | 63-69527 | 3/1988 | |
| JP | 1-208310 | 8/1989 | |
| JP | 1-305809 | 12/1989 | |
| JP | 2 187153 A | 7/1990 | |
| JP | 03-245811 | 1/1991 | |
| JP | 04-200720 | 7/1992 | |
| JP | 06-253682 | 9/1994 | |
| JP | 10-057745 | 3/1998 | |
| JP | 2000-051634 | 2/2000 | |
| JP | 2000-107895 | 4/2000 | |
| JP | 2004-089770 | 3/2004 | |
| JP | 2004-261757 | 9/2004 | |
| JP | 2006-340683 | 12/2006 | |
| JP | 2007-190529 | 8/2007 | |
| RU | 511963 | 6/1976 | |
| RU | 715120 | 2/1980 | |
| RU | 2097115 | 11/1997 | |
| SD | 1 828 406 | 7/1993 | |
| SU | 1 828 406 | 7/1993 | |
| WO | WO 94/13386 A1 | 6/1994 | |
| WO | WO 98/16296 | 4/1998 | |
| WO | WO 98/17388 | 4/1998 | |
| WO | WO 98/22173 A | 5/1998 | |
| WO | WO 00/50154 | 8/2000 | |
| WO | WO 00/76633 | 12/2000 | |
| WO | WO 01/21269 | 3/2001 | |
| WO | WO 2005/108297 | 11/2005 | |
| WO | WO 2006/009600 | 1/2006 | |
| WO | WO 2006/036396 | 4/2006 | |
| WO | WO 2006/084008 | 8/2006 | |
| WO | WO 2007/016271 | 2/2007 | |
| WO | WO 2007/016274 | 2/2007 | |
| WO | WO 2007/114991 | 10/2007 | |
| WO | WO 2008/042919 | 4/2008 | |
| WO | WO 2008/131132 | 4/2008 | |
| WO | WO 2008/061210 | 5/2008 | |
| WO | WO 2009/149292 | 12/2009 | |

OTHER PUBLICATIONS

"Extraction CO2 from the Air", Lackner presentation, 12 pgs.
"Compensation of Atmospheric CO2 Buildup Through Engineered Chemical Sinkage", Elliott et al., pp. 1-8.
"The Case for Carbon Dioxide Extraction From Air", Lackner et al., Sourcebook, Sep. 1999, vol. 57, No. 9, pp. 6-10.
U.S. Appl. No. 11/683,824, filed Mar. 8, 2007, Wright et al.
"Imagine No Restrictions on Fossil-Fuel Usage and No Global Warming!", Rickman, found at http://www.lanl.gov/news/releases/archive/02-028.shtml.
"In the Lab", Jason Hensel, found at www.eponline.com.
"Science for Sustainability: From Capturing Carbon Dioxide From Air to Environmental Impact of a Hydrogen Economy", Dubey, found at http://www.mbari.org/seminars/2003/spring2003/apr2dubey.html.
Abstracts of Eos. Trans. AGU, 83 (47), Spring Meeting 2002, 3 pgs.
Abstracts of Eos. Trans. AGU, 83 (47), Fall Meeting 2002, 3 pgs.
Environment & Climate News, vol. 5, No. 7, Aug. 2002, 20 pgs.
"Carbon Sequestration Could Be Employed Today to Help Alleviate Greenhouse Emissions" found at http://ww.earthinstitute.columbia.edu/news/2003/story06-25-03b.html.
"CO2 Capture from the Air: Technology Assessment and Implications for Climate Policy", Keith et al., pp. 1-6.
Resume of David Keith, Spring 2005, 8 pgs. "Climate Strategy with CO2 Capture From the Air", Keith et al., found at http://ideas.repec.org/p/hal/papers/halshs-00003926_vl.html.
"Information About: David Keith" found at http://ideas.respec.org/e/pke74.html.
"Climate Strategy with CO2 Capture from the Air" Keith et al., Mar. 31, 2005, pp. 1-43.
Abstracts of Eos. Trans. AGU, 82 (47), Fall Meeting 2001, 3 pgs.
T. Sata, "Monovalent Cation Permselective Exchange Membrane", Apr. 15, 1972, pp. 980-982.
Toshikatsu Sata, "Modification of Properties of Ion-Exchange Membranes. IV. Change of Transport Properties of Cation-Exchange Membranes by Various Polyelectrolytes", 1978, pp. 1063-1080.
Toshikatsu Sata, Yukio Mizutani, "Modification of Properties of Ion Exchange Membranes. VI. Electrodialytic Transport Properties of Cation Exchange Membranes with a Electrodeposition Layer of Cationic Polyelectrolytes", 1979, pp. 1199-1213.
Toshikatsu Sata, "Modification of Properties of Ion Exchange Membranes. VII. Relative Transport Number between Various Cations of Cation Exchange Membrane Having Cationic Polyelectrolyte Layer and Mechanism of Selective Permeation of Particular Cations", 1979, pp. 2071-2085.
"Americans Believe in Global Warming . . . and Psychic Powers, Astrology, and UFO'S", S. Fred Singer, found at http://heartland.org/.
"Capturing Carbon Dioxide From Air", Lackner et al., pp. 1-15.
"Carbon Dioxide Extraction from Air: Is It an Option?", Lackner et al., Proceedings of the 24th Annual Technical Conference on Coal Utilization and Fuel Systems, Mar. 8-11, 1999, pp. 885-896.
"Carbon Dioxide Extraction From Air", Lackner et al., Arguments pp. 1-5.
"Chemical Extraction of Carbon Dioxide from Air to Sustain Fossil Energy by Avoiding Climate Change", Dubey et al., 2nd Annual Conference on Carbon Sequestration, 2003.
"Climate Strategy with $CO_2$ Capture from the Air" Keith et al., Mar. 31, 2005, pp. 1-43.
"$CO_2$ Capture from the Air: Technology Assessment and Implications for Climate Policy", Keith et al., pp. 1-6.
"Compensation of Atmospheric $CO_2$ Buildup Through Engineered Chemical Sinkage", Elliot et al., pp. 1-8.
"Extraction of Carbon Dioxide from the Atmosphere Through Engineered Chemical Sinkage", Dubey et al., Fuel Chemistry Division Preprints, 2001, pp. 1-4.
"$CO_2$ Extraction from Air", Lackner et al.
"Imagine No Restriction on Fossil-Fuel Usage and No Global Warming!", Rickman, found at http://www.lanl.gov/news/releases/archive/02-028.shtml.
"In the Lab", Jason Hensel, found at www.eponline.com/articles/53584.
"New Findings may Redefine Renewable Energy Debate", Bituin, found at http://www.dailycal.org/article.php?id=8559.
"Science for Sustainability: From Capturing Carbon Dioxide From Air to Environmental Impact of a Hydrogen Economy", Dubey, found at http://www.mbari.org/seminars/2003/spring2003/apr2_dubey.html.
"*The Carrot or the Slick: How to Build a Technology-Friendly Climate Policy in Canada*" Presentation by David Keith, Climate Change Central Apr. 15, 2005, pp. 1-32.
"The Case for Carbon Dioxide Extraction From Air," ($CO_2$ Extraction From Air, A White Paper from Los Alamos National Labs) Lackner et al., Sourcebook, Sep. 1999, vol. 57, No. 9, pp. 6-10.
J. Balster et al., "Multi-Layer Spacer Geometries With Improved Mass Transport", May 16, 2006, pp. 351-361.
Official Action issued in Applicants' counterpart Chinese Patent Application Serial No. 200680030297.
Russian Official Action + Translation, dated Feb. 11, 2010, Appln. No. 2007132880/15 (05886), (13 pgs).
Official Action received in related Chinese Patent Application Serial No. 200680030297.
Official Action received in related Australian Patent Application Serial No. 2006210619.
Abstracts of Eos. Trans. AGU, 82 (47), Fall Meeting 2001; pp. 3.
Abstracts of Eos. Trans. AGU, 83 (19), Spring Meeting 2002; pp. 3.
Abstracts of Eos. Trans. AGU, 83 (47), Fall Meeting 2002; pp. 3.
"An Industrial Sized Unit" Drawing and specification.
Balster et al., "Multi-Layer Spacer Geometries With Improved Mass Transport", 2006; pp. 351-361.
Bituin, "New Findings May Redefine Renewable Energy Debate", found at http://www.dailycal.org/article.php?id=8559.
"Carbon Sequestration Could Be Employed Today to Help Alleviate Greenhouse Emissions" found at http://www.earthinstitute.columbia.edu/news/2003/story06-25-03b.html.
Chinese Official Action dated May 5, 2010 and Jan. 20, 2011, Appln. No. 200680030297.X.
Chinese Official Action dated Dec. 3, 2010, Appln. No. 200780008015.
Choi et al. "A new preparation for cation-exchange membrane using monomer sorption into reinforcing materials" Desalination 146. Mar. 22. 2002.
Choi et al. "Characterization of LDPE/polystyrene cation exchange membranes prepared by monomer sorption and UV radiation polymerization" Journal of Membrane Science 223 (2003) 201-215. Jul. 13, 2003.
Choi et al. "Preparation and characterization of LDPE/polyvinvylbenzyl trimethyl ammonium salts anion-exchange membrane" Journal of Membrane Science 221 (2003) 219-231. Jun. 13, 2003.
Cuiming et al. "Fundamental Studies of a New Hybrid (Inorganic-Organic) Positively Charged Membrane: Membrane Preparation and Characterizations" Journal of Membrane Science 216 (2003) 269-278 Feb. 16, 2003.
Dubey et al., "Chemical Extraction of Carbon Dioxide from Air to Sustain Fossil Energy by Avoiding Climate Change", 2nd Annual Conference on Carbon Sequestration, 2003.
Dubey et al., "Extraction of Carbon Dioxide from the Atmosphere Through Engineered Chemical Sinkage", Fuel Chemistry Division Preprints, 2001; pp. 1-4.
Dubey, "Science for Sustainability: From Capturing Carbon Dioxide From Air to Environmental Impact of a Hydrogen Economy", found at http://www.mbari.org/seminars/2003/spring2003/apr2_dubey.html.
Elliot et al., "Compensation of Atmospheric CO2 Buildup Through Engineered Chemical Sinkage", pp. 1-8.
Environment & Climate News, 2002; vol. 5, No. 7.
Fuertes et al. "Carbon Composite Membranes from Matrimid and Kapton Polymides for Gas Separation" Microporous and Mesoporous Materials 33 (1999) 115-125 Jun. 16, 1999.
Hashimoto et al., "Global CO2 recycling", (1996) Zairyo to Kankyo/ Corrosion Engineering, 45 (10), pp. 614-620 (Abstract only).
Hensel, "In the Lab", found at www.eponline.com/articles/53584.
"Information About: David Keith" found at http://ideas.respec.org/e/pke74.html, http://www.ucalgary.ca/~keith/.
Information on David Keith found at http://www.ucalgary.ca/~keith/.
International Preliminary Report on Patentability, Dated Jan. 24, 2008 PCT/US2006/003646.
International Preliminary Report on Patentability, mailed Jun. 10, 2010 PCT/US2007/063607.
International Preliminary Report on Patentability, Aug. 11, 2009 PCT/US2009/053461.
International Preliminary Report on Patentability, Aug. 24, 2009 PCT/US2009/054795.
International Preliminary Report on Patentability, mailed Feb. 24, 2011, PCT/US09/53461.
International Preliminary Report on Patentability, Nov. 15, 2007 PCT/US2007/084880.
International Preliminary Report on Patentability, Jan. 27, 2009, PCT/US2007/84237.
International Preliminary Report on Patentability, Oct. 20, 2009, PCT/U S2008/60672.
International Preliminary Report on Patentability, May 11, 2010, PCT/US2008/82505.
International Preliminary Report on Patentability, Dec. 6, 2010, PCT/US2009/46306.
International Preliminary Report on Patentability, Jun. 1, 2010, PCT/US2007/80229.
International Preliminary Report on Patentability, Jan. 29, 2008, PCT/US2006/029238.
International Search report and Written Opinion Feb. 2, 2006 PCT/US2006/003646.
International Search report and Written Opinion Jul. 28, 2006 PCT/US2006/029238.
International Search report and Written Opinion mailed Feb. 25, 2008 PCT/US2007/63607.
International Search report and Written Opinion mailed Mar. 8, 2008 PCT/US2007/80229.
International Search report and Written Opinion mailed Apr. 23, 2008 PCT/US2007/84880.
International Search report and Written Opinion mailed Sep. 15, 2008 PCT/US2008/60672.
International Search report and Written Opinion mailed Dec. 24, 2008 PCT/US2008/82505.

International Search report and Written Opinion mailed Sep. 25, 2009 PCT/US2009/53461.
International Search report and Written Opinion mailed Dec. 9, 2009 PCT/US2009/54795.
International Search report and Written Opinion mailed Jan. 27, 2009 PCT/US2008/84237.
International Search report and Written Opinion mailed Sep. 3, 2009 PCT/US2009/46306.
International Search Report and Written Opinion dated Oct. 4, 2006 PCT/US05/29584.
International Preliminary Report on Patentability dated Feb. 20, 2007 PCT/US05/29584.
Japanese Official Action, Application Serial No. 2009-531567, dated Feb. 7, 2011, 4 pgs.
Japanese Official Action, Application Serial No. 2008-524154, dated Feb. 16, 2011, 4 pgs.
Keith et al., "Climate Strategy with CO2 Capture from the Air" 2005; pp. 1-43.
Keith et al., "CO2 Capture from the Air: Technology Assessment and Implications for Climate Policy", pp. 1-6.
Keith et al., Resume of David Keith, Spring 2005, 8 pgs. "Climate Strategy with CO2 Capture From the Air", found at http://ideas.repec.org/p/hal/papers/halshs-00003926_v1.html.
Lackner et al., "Capturing Carbon Dioxide From Air", pp. 1-15.
Lackner et al., "Carbon Dioxide Extraction from Air?", Arguments pp. 1-5.
Lackner et al., "Carbon Dioxide Extraction from Air: Is It an Option?", Proceedings of the 24th Annual Technical Conference on Coal Utilization and Fuel Systems, 1999; pp. 885-896.
Lackner et al., "CO2 Extraction from Air" A White Paper from Los Alamos National Labs, The Reddy Corporation International, Sourcebook, Sep. 1999 (12 PGS).
Lackner et al., "Free-Market Approaches to Controlling Carbon Dioxide Emissions to the Atmosphere: A Discussion of the scientific basis", Los Alamos National Laboratory (Lackner & Ziock) & Harvard University (Wilson), pp. 1-16.
Lackner et al., "The Case for Carbon Dioxide Extraction From Air," Sourcebook, Sep. 1999; vol. 57, No. 9, pp. 6-10.
Lackner K.S., Grimes P., Ziock H-J, 'Capturing Carbon Dioxide from Air' First National Conference on Carbon Sequestration (Washington) 2001.
Lackner, Klaus S., "Can Fossil Carbon Fuel the $21^{st}$ Century?", International Geology Review, vol. 44, 2002, pp. 1122-1133.
"Extraction CO2 from the Air", Lackner presentation, 12 pages.
Liang, "Carbon Dioxide Capture From Flue Gas Using Regenerable Sodium-Based Sorbents", dated Aug. 1, 2003, Department of Chemical Engineering Thesis, (137 pgs).
Liu et al., "Composite Membranes from Photochemical Synthesis of Ultrathin Polymer Films" Nature vol. 352 Jul. 4, 1991.
Mexican Official Action, Dated Jan. 24, 2011, Serial No. MX/a/2007/002019.
Mexican Official Action, Dated Feb. 2, 2011, Serial No. MX/a/2008/011464.
Mizutani, Y "Structure of Ion Exchange Membranes" Journal of Membrane Science 49 (1990) 121-144 Aug. 21, 1989.
Murdoch et al., "Sabatier Methanation Reactor for Space Exploration", (2005) A Collection of Technical Papers—$1^{st}$ Space Exploration Conference: Continuing the Voyage of Discovery, 2, pp. 981-987 (Abstract only).
"New Solutions to Oil Problems", Whitley Strieber's Unknown Country, 2002, found at http://www.unknowncountry.com/news/print.phtml?id=1467.
Office Action dated Sep. 11, 2009 in U.S. Appl. No. 11/209,962.
Office Action dated Feb. 23, 2010 in U.S. Appl. No. 11/209,962.
Office Action dated Jun. 9, 2010 in U.S. Appl. No. 11/209,962.
Office Action dated Aug. 27, 2010 in U.S. Appl. No. 11/209,962.
Office Action dated Feb. 1, 2011 in U.S. Appl. No. 11/209,962.
Office Action dated Oct. 1, 2009 in U.S. Appl. No. 11/227,660.
Office Action dated Jan. 27, 2010 in U.S. Appl. No. 11/227,660.
Office Action dated Oct. 7, 2010 in U.S. Appl. No. 11/227,660.
Office Action dated Jan. 25, 2011 in U.S. Appl. No. 11/227,660.
Office Action dated Mar. 30, 2009 in U.S. Appl. No. 11/346,522.
Office Action dated Jun. 17, 2009 in U.S. Appl. No. 11/346,522.
Office Action dated Oct. 7, 2009 in U.S. Appl. No. 11/683,824.
Office Action dated Mar. 15, 2010 in U.S. Appl. No. 11/683,824.
Office Action dated Jun. 28, 2010 in U.S. Appl. No. 11/683,824.
Office Action dated Nov. 19, 2010 in U.S. Appl. No. 11/683,824.
Office Action dated Nov. 10, 2010 in U.S. Appl. No. 11/996,615.
Office Action dated Apr. 6, 2011 in U.S. Appl. No. 11/996,615.
Office Action dated Nov. 9, 2010 in U.S. Appl. No. 12/638,717.
Office Action dated Feb. 11, 2011 in U.S. Appl. No. 12/638,717.
Office Action dated Mar. 11, 2011 in U.S. Appl. No. 12/903,962.
Office Action dated Mar. 11, 2011 in U.S. Appl. No. 12/903,967.
Office Action dated Mar. 11, 2011 in U.S. Appl. No. 12/903,970.
Office Action dated Mar. 11, 2011 in U.S. Appl. No. 12/903,974.
Office Action dated Mar. 11, 2011 in U.S. Appl. No. 12/903,981.
Official Action dated Mar. 28, 2011 in U.S. Appl. No. 12/389,213.
Official Action dated Mar. 15, 2010, U.S. Appl. No. 11/683,824, 10 pgs.
Official Action for U.S. Appl. No. 11/209,962, dated Sep. 11, 2009, (16 pgs).
Official Action issued in Applicants' counterpart Chinese Patent Application Serial No. 200680003905.8 dated Jun. 12, 2009.
Official Action issued in Applicants' counterpart European Patent Application Serial No. 05 793 918.3-1213 dated Jan. 19, 2010.
Official Action issued in Applicants' counterpart European Patent Application Serial No. 06 788 685.3-1213 dated Oct. 16, 2009.
Official Action issued in Applicants' counterpart European Patent Application Serial No. 07 758 183.3 dated Jun. 22, 2010.
Official Action issued in Applicants' counterpart European Patent Application Serial No. 07864483.8 dated Jan. 7, 2011.
Official Action issued in Applicants' counterpart Russian Patent Application Serial No. 2008139902 (051576) dated Feb. 4, 2011.
Official Action issued in Applicants' counterpart Russian Patent Application Serial No. 2008139902 dated Nov. 19, 2010.
Official Action received in Applicants' related Australian Patent Application Serial No. 2005290082 dated Apr. 20, 2007.
Official Action received in Applicants' related Australian Patent Application Serial No. 2005290082 dated Mar. 5, 2010.
Official Action received in Applicants' related Australian Patent Application Serial No. 2005290082 dated Apr. 13, 2010.
Official Action received in Applicants' related Australian Patent Application Serial No. 2005290082 dated May 20, 2010.
Official Action received in Applicants' related Australian Patent Application Serial No. 2005290082 dated Jul. 22, 2010.
Official Action received in related Australian Patent Application Serial No. 2006210619 dated Mar. 1, 2010.
Official Action received in Applicants' related Australian Patent Application Serial No. 2007233275 dated Jan. 14, 2011.
Official Action received in Applicants' related Australian Patent Application Serial No. 2007303240 dated Feb. 9, 2011.
Official Action received in Applicants' related New Zealand Patent Application Serial No. 575870 dated Mar. 17, 2011 and Nov. 11, 2010.
"Researchers Explore Extracting CO2 Directly From Air" found at http://www.earthvision.net/ColdFusion/News_Page1.cfm?NewsID=20309.
Resume of David Keith, Academic CV, Spring 2005, 8 pgs.
Rickman, "Imagine No Restriction on Fossil-Fuel Usage and No Global Warming!", found at http://www.lanl.gov/news/releases/archive/02-028.shtml.
Russian Official Action + Translation, dated Feb. 2, 2006, Appln. No. 2007132880/15 (035886).
Russian Official Action + Translation, dated Sep. 15, 2010 Appln. No. 2007132880/15 (035886).
Russian Official Action + Translation, dated Feb. 11, 2010, Appln. No. 2007132880/15, (13 pgs).
Singer, Fred S., "Americans Believe in Global Warming . . . and Psychic Powers, Astrology, and UFO's", found at http://heartland.org/.
Snowpure, LLC, SnowPure Excellion Product Information and Brochure, Aug. 2009.
Sun et al., "$CO_2$ sorption in activated carbon in the presence of water", dated Feb. 9, 2007, Science Direct, Chemical Physics Letterse 437 (2000) (abstract enclosed).

T. Sata, "Monovalent Cation Permselective Exchange Membrane", Apr. 15, 1972, pp. 980-982.

"The Carrot or the Stick: How to Build a Technology-Friendly Climate Policy in Canada" Presentation by David Keith, Climate Change Central Apr. 15, 2005, pp. 1-32.

Toshikatsu Sata, "Modification of Properties of Ion Exchange Membranes. IV. Change of Transport Properties of Cation-Exchange Membranes by Various Polyelectrolytes", 1978, pp. 1063-1080.

Toshikatsu, Yukio Mizutani, "Modification of Properties of Ion Exchange Membranes. VI. Electrodialytic Transport Properties of Cation Exchange Membranes with a Electrodeposition Layer of Cationic Polyelectrolytes", 1979, pp. 1199-1213.

Toshikatsu, Yukio Mizutani, "Modification of Properties of Ion Exchange Membranes. VII. Relative Transport Number between Various Cations of Cation Exchange Membrane Having Cationic Polyelectrolyte Layer and Mechanism of Selective Permeation of Particular Cations", 1979, pp. 2071-2085.

Yin, et al., "Absorption and steam desorption performance of weak base anion exchange resin" (1995) Hangtian Yixue Yu Yixue Gongcheng/Space Medicine and Medical Engineering, 8 (1), pp. 27-31. (Abstract only).

"Written Public Comments on the Strategic Plan for the U.S. Climate Change Science Program, General Comments", 2003, pp. 1-160.

Official Action received in Applicants' related Australian Patent Application Serial No. 2010241388 dated Jul. 7, 2011.

Official Action received in Applicants' related Australian Patent Application Serial No. 2007319211 dated Jun. 17, 2011.

Official Action received in Applicants' related Australian Patent Application Serial No. 2007233275 dated Jun. 1, 2011.

Official Action received in Applicants' related Mexican Patent Application Serial No. MX/a/2007/009081, dated Jul. 18, 2011.

Official Action received in Applicants' related New Zealand Patent Application Serial No. 575870 dated Jun. 27, 2011.

U.S. Appl. No. 12/596,642, filed Oct. 19, 2009, Wright et al.

Dow Chemical Company, Dowex Type 1 Strong Base Anion Resin, 1998, http://www.inaqua.de/Prod/ion/pdf_en/313_UPCORE_Mono_A625.pdf, p. 1.

International Search Report and Written Opinion mailed Jan. 27, 2009.

Yukio Mizutani. "Structure of Ion Exchange Membranes". Journal of Membrane Science, 49 (1990) 121-144, Aug. 21, 1989.

Yong-Jin Choi et al. "A new preparation for cation-exchange membrane using monomer sorption into reinforcing materials". Desalination 146. Mar. 22, 2002.

Yong-Jin Choi et al. "Characterization of LDPEA/polystyrene cation exchange membranes prepared by monomer sorption and UV radiation polymerization". Journal of Membrane Science 223 (2003) 201-215. Jul. 13, 2003.

Yong-Jin Choi et al. "Preparation and characterization of LDPE/polyvinyl benzyl trimethyl ammonium salts anion-exchange membrane". Journal of Membrane Science 221 (2003) 219-231. Jun. 13, 2003.

Canadian Official Action dated Jun. 21, 2011, Appln. No. 2,577,685.

Chinese Official Action dated Apr. 28, 2011 Appln. No. 200780042511.8.

Chinese Official Action dated Jun. 13, 2011, Appln. No. 200780008015.0.

Huang, Houping and Chang, Shih-Ger "Method to Regenerate Ammonia for the Capture of Carbon Dioxide" Energy and Fuels 2002, 16, 904-910.

International Search Report and Written Opinion dated Nov. 24, 2010 GCC/P/2007/9020.

Israel Official Action, U.S. Appl. No. 25585/09, dated Jun. 30, 2011.

Japanese Official Action, U.S. Appl. No. 2008-524154, dated May 31, 2011, 3 pgs.

Office Action dated Aug. 3, 2011 in U.S. Appl. No. 12/903,962.

Office Action dated Aug. 1, 2011 in U.S. Appl. No. 12/903,974.

Official Action dated Jul. 1, 2011 in U.S. Appl. No. 13/102,915.

Official Action issued in Applicants' counterpart European Patent Application Serial No. 07 758 183.3-1213 dated Jul. 4, 2011.

Official Action issued in Applicants' counterpart European Patent Application Serial No. 07 853 742.0-1213 dated Jul. 27, 2011.

Official Action issued in Applicants' counterpart European Patent Application Serial No. 08 746 144.8-2113 / 2139584 dated May 9, 2011.

Official Action issued in Applicants' counterpart Russian Patent Application Serial No. 2009116621/05 (022802) dated Jun. 1, 2011.

European Official Action, Serial No. 06 788 685.-1213, dated Oct. 12, 2011 (3 pages).

Mexican Official Action, Serial No. MX/a/2009/003500, dated Oct. 12, 2011 (3 pages).

Mexican Official Action, Serial No. MX/a/2007/002019, dated Aug. 31, 2011 (Mexico Attorney notified Attorney of record in instant application on Sep. 22, 2011) (2 pages).

Russian Official Action, Serial No. 2008139902/15, dated Jul. 20, 2011 (Russian Attorney notified Attorney of record in instant application on Sep. 15, 2011) (6 pages).

Russian Official Action, Serial No. 200914222/05, dated Sep. 30, 2011 (9 pages).

US Official Action, U.S. Appl. No. 12/274,986, dated Nov. 3, 2011 (36 pages).

US Official Action, U.S. Appl. No. 13/208,156, dated Oct. 26, 2011 (21 pages).

US Official Action, U.S. Appl. No. 11/209,962, dated Oct. 6, 2011 (24 pages).

US Official Action, U.S. Appl. No. 12/615,971, dated Sep. 29, 2011 (33 pages).

US Official Action, U.S. Appl. No. 13/102,915, dated Sep. 27, 2011 (10 pages).

US Official Action, U.S. Appl. No. 12/389,213, dated Sep. 27, 2011 (27 pages).

US Notice of Allowance, U.S. Appl. No. 12/265,556, dated Nov. 7, 2011 (33 pages).

Office action dated Feb. 3, 2012 for U.S. Appl. No. 13/102,915.

Office action dated Mar. 14, 2012 for U.S. Appl. No. 11/209,962.

Office action dated Apr. 13, 2012 for U.S. Appl. No. 13/102,901.

U.S. Appl. No. 13/386,587, filed Jan. 23, 2012, Lackner et al.

European examination report dated Dec. 19, 2011 for EP Application No. 08746144.8.

European search report and opinion dated Jan. 7, 2011 for EP Application No. 07864483.8.

European search report and opinion dated Apr. 20, 2011 for EP Application No. 08746144.8.

European search report and opinion dated Dec. 21, 2011 for EP Application No. 11008476.1.

International search report and written opinion dated May 12, 2009 for PCT/US2009/034554.

International search report and written opinion dated Aug. 30, 2007 for PCT/US2005/032848.

International search report and written opinion dated Sep. 3, 2009 for PCT/US2009/046306.

International search report and written opinion dated Nov. 17, 2010 for PCT/US2010/043133.

International search report and written opinion dated Dec. 9, 2009 for PCT/US2009/054795.

Office action dated Feb. 4, 2010 for U.S. Appl. No. 12/555,874.

Office action dated Mar. 9, 2009 for U.S. Appl. No. 11/207,236.

Office action dated May 26, 2011 for U.S. Appl. No. 11/209,962.

Office action dated Jul. 3, 2008 for U.S. Appl. No. 11/207,236.

Office action dated Dec. 1, 2011 for U.S. Appl. No. 13/102,901.

Weber, et al. The absorption of carbon dioxide by weak base ion exchange resins. Aiche Journal. Jul. 1970; 609-614. http://onlinelibrary.wiley.com/doi/10.1002/aic.690160417/pdf.

Zeman, et al. Capturing carbon dioxide directly from the atmosphere. World resource review. 2004; 16(2):157-172.

* cited by examiner

FIG. 1 (Prior art)
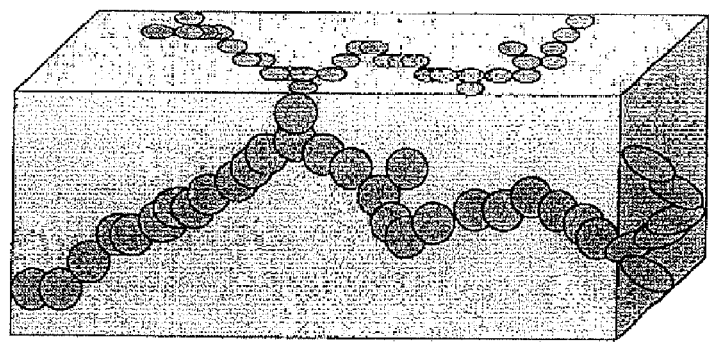
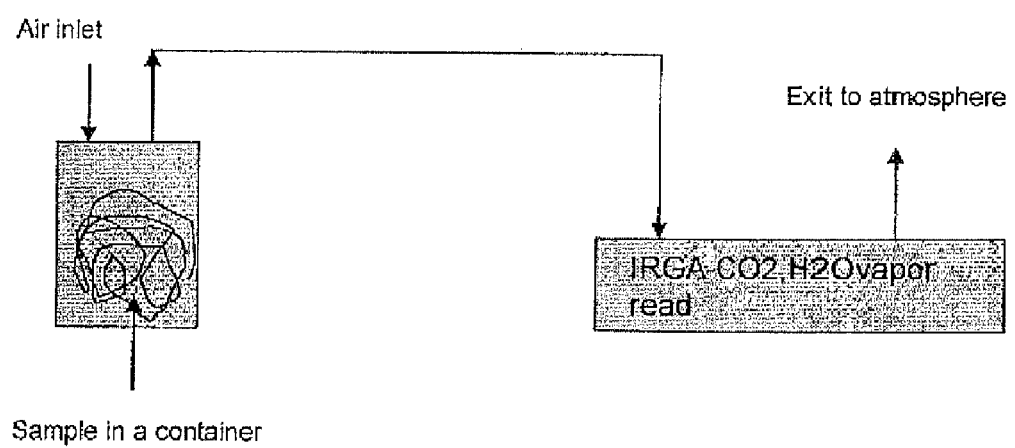
FIG. 2

AIR COLLECTOR WITH FUNCTIONALIZED ION EXCHANGE MEMBRANE FOR CAPTURING AMBIENT $CO_2$

CROSS REFERENCE TO RELATED APPLICATION

This application claims priority from U.S. Provisional Application 60/989,405, filed Nov. 20, 2007; U.S. Provisional Application No. 61/058,876 filed Jun. 4, 2008, and U.S. Provisional Application No. 61/080,110, filed Jul. 11, 2008, the contents of which are incorporated hereby reference.

FIELD OF THE INVENTION

The embodiments of the present invention in one aspect relates to removal of selected gases from air. The embodiments of the invention have particular utility for the extraction of carbon dioxide ($CO_2$) from air and will be described in connection with such utilities, although other utilities are contemplated, including the sequestration of other gases including $NO_x$ and $SO_2$.

BACKGROUND OF THE INVENTION

There is compelling evidence to suggest that there is a strong correlation between the sharply increasing levels of atmospheric $CO_2$ with a commensurate increase in global surface temperatures. This effect is commonly known as Global Warming. Of the various sources of the $CO_2$ emissions, there are a vast number of small, widely distributed emitters that are impractical to mitigate at the source. Additionally, large scale emitters such as hydrocarbon-fueled power plants are not fully protected from exhausting $CO_2$ into the atmosphere. Combined, these major sources, as well as others, have lead to the creation of a sharply increasing rate of atmospheric $CO_2$ concentration. Until all emitters are corrected at their source, other technologies are required to capture the increasing, albeit relatively low, background levels of atmospheric $CO_2$. Efforts are underway to augment existing emissions reducing technologies as well as the development of new and novel techniques for the direct capture of ambient $CO_2$. These efforts require methodologies to manage the resulting concentrated waste streams of $CO_2$ in such a manner as to prevent its reintroduction to the atmosphere.

The production of $CO_2$ occurs in a variety of industrial applications such as the generation of electricity power plants from coal and in the use of hydrocarbons that are typically the main components of fuels that are combusted in combustion devices, such as engines. Exhaust gas discharged from such combustion devices contains $CO_2$ gas, which at present is simply released to the atmosphere. However, as greenhouse gas concerns mount, $CO_2$ emissions from all sources will have to be curtailed. For mobile sources the best option is likely to be the collection of $CO_2$ directly from the air rather than from the mobile combustion device in a car or an airplane. The advantage of removing $CO_2$ from air is that it eliminates the need for storing $CO_2$ on the mobile device.

Extracting carbon dioxide ($CO_2$) from ambient air would make it possible to use carbon-based fuels and deal with the associated greenhouse gas emissions after the fact. Since $CO_2$ is neither poisonous nor harmful in parts per million quantities, but creates environmental problems simply by accumulating in the atmosphere, it is possible to remove $CO_2$ from air in order to compensate for equally sized emissions elsewhere and at different times.

Various methods and apparatus have been developed for removing $CO_2$ from air. In one prior art method, air is washed with a sorbent such as an alkaline solution in tanks filled with what are referred to as Raschig rings that maximize the mixing of the gas and liquid. The $CO_2$ interacts with and is captured by the sorbent. For the elimination of small amounts of $CO_2$, gel absorbers also have been used. Although these methods are effective in removing $CO_2$, they have a serious disadvantage in that for them to efficiently remove carbon dioxide from the air; the air must be driven past the sorbent at fairly high pressures.

The most daunting challenge for any technology to scrub significant amounts of low concentration $CO_2$ from the air involves processing vast amounts of air and concentrating the $CO_2$ with an energy consumption less than that that originally generated the $CO_2$. Relatively high pressure losses occur during the scrubbing process resulting in a large expense of energy necessary to compress the air. This additional energy used in compressing the air can have an unfavorable effect with regard to the overall carbon dioxide balance of the process, as the energy required for increasing the air pressure may produce its own $CO_2$ that may exceed the amount captured negating the value of the process.

Prior art methods result in the inefficient capture of $CO_2$ from air because these prior art methods heat or cool the air, or change the pressure of the air by substantial amounts. As a result, the net reduction in $CO_2$ is negligible as the capture process may introduce $CO_2$ into the atmosphere as a byproduct of the generation of electricity used to power the process.

In co-pending U.S. application Ser. No. 11/683,824, filed Mar. 8, 2007, U.S. Publication No. U.S.-2007-0217982-A1, assigned to a common assignee, there is described an air capture device that utilizes a solid functionalized anion exchange material that is formed to provide a relatively large surface area which allows for air flow. The solid anion exchange material may be formed from membranes of anion exchange material such as functionalized polystyrene or the like, or comprise membranes of inert substrate material coated with anion exchange material. In a preferred embodiment of our prior invention, the anion exchange material comprises "noodle-like" 1 mm thick by 1 mm wide strands formed by slitting commercially available anion exchange membrane material available from Snowpure, LLC, San Clemente, Calif. The manufacturer describes this membrane material as comprising crushed anionic exchange resin mixed in a polypropylene matrix and extruded as a membrane according to the teachings of U.S. Pat. Nos. 6,503,957 and 6,716,888. The solid anion exchange polymer also maybe formed into cells or the like.

SUMMARY OF THE INVENTION

The present invention explores alternative solid ion exchange materials for currently utilized ion exchange materials as above described as solid sorbent materials for $CO_2$ air-capture. More particularly, there is provided a process for forming solid sorbent materials for $CO_2$ air capture by immobilizing solid $CO_2$ sorbent materials in or on a support. In a preferred embodiment of the invention the solid $CO_2$ sorbent materials comprise solid particulate sorbent materials held together in a porous matrix. Alternatively, the solid $CO_2$ sorbent materials may comprise solid particulate sorbent materials supported on a surface of a support matrix. The support matrix may take a form of a membrane, which may be cut or slit into elongate elements, fiber strands which may be ordered or unordered, various geometric shapes such as tubes or bundles of tubes, honeycombs, discs or the like.

BRIEF DESCRIPTION OF THE DRAWINGS

Further features and advantages of the present invention will be seen from the following detailed description taken in conjunction with the accompanying drawings, wherein like numerals depict like parts, and wherein:

FIG. 1 is a three-dimensional depiction of a polymer matrix of the prior art Snowpure membrane showing resin beads interspersed throughout the matrix.

FIG. 2 is a schematic depiction of the $CO_2/H_2O$ vapor measurement device apparatus used in this investigation.

DETAILED DESCRIPTION OF THE INVENTION

Figure 3:
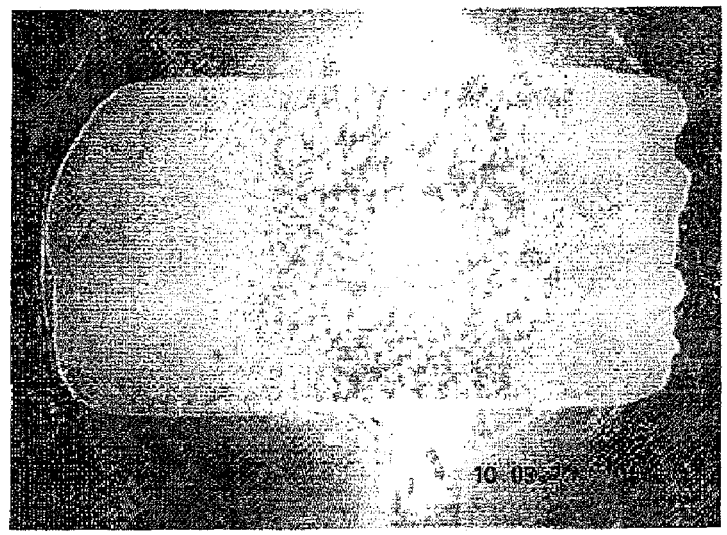
FIG. 3 shows the PSU-resin membrane before gelling.

In order to develop alternative methods for forming solid $CO_2$ sorbent materials we first needed to better understand the structure of the currently utilized commercially available materials and the reasons why such materials are capable of absorbing $CO_2$. As best understood from the aforesaid U.S. Pat. Nos. 6,503,957 and 6,716,888, the Snowpure materials are made by a thermal extrusion method using polypropylene as the support matrix and ground anion exchange resin powder as an active filler. The polypropylene polymer is hydrophobic so it can afford physical support and not be soluble in aqueous solutions. The polypropylene polymer matrix has a narrow molecular weight distribution and low melting point (125~130° C., although usually polypropylene melts at around 160° C.). The low melting temperature helps avoid thermal decomposition of the resin powders during the extrusion process. Also the polypropylene matrix is stable under chemical conditions such as high basicity or acidity.

According to the aforesaid U.S. patents of Snowpure, in the manufacturing process described by Snowpure, the polypropylene is melted in an extruder, and the resin powders are added into the melted polymer together with glycerin. The resin particles are hydrophilic and have exchangeable ions when wet. Glycerin is believed to help disperse the resin particles in the polymer matrix and form a barrier layer between resin and polymer. After extrusion, the membrane is soaked in an 80° C. water bath to remove the glycerin and to fully expand the resin. The structure is called a "composite" membrane because it consists of two phases, the polypropylene polymer matrix and the agglomeration of resin powders which it is believed forms continuous channels in the polymer. FIG. 1 is a simplified representation of the basic structure of the material obtained from Snowpure, except that the volume fill of the resin is much larger than depicted below.

The continuous channel shown by the continuous resin beads is believed to be important for membrane function in the Snowpure material. If the resin agglomerations are discontinuous or separated from each other and surrounded by polymer, the final membrane would be hydrophobic and would not be able to conduct ions in water or adsorb $CO_2$ at all.

The following examples describe alternative methods for forming solid sorbent materials for $CO_2$ air capture:

A first method of fabrication is based on solvent casting techniques.

This process starts with a polymerizable monomer or polymer in a liquid carrier having dispersed therein particles of a solid $CO_2$ sorbent material. There are two major properties for the polymerizable monomers used in this method. First, the polymerizable monomer or monomer blend or polymer should be soluble in the liquid carrier; second, the polymerizable monomer or monomer blend or polymer should be able to form a polymer sheet or film. Amongst preferred polymers are mentioned polybisphenol-A-carbonate, poly(ethylene terephthalate), polystyrene, poly(methyl methacrylate), poly (vinyl acetate), poly(vinyl chloride), polytetrafluoroethylene, polysulfone, poly(vinylidene fluoride), styrene/butyl acrylate/methacrylic acid terpolymer, and poly(vinylidene fluoride-co-hexafluoropropylene).

The solid $CO_2$ sorbent materials are materials capable of absorbing and releasing gaseous $CO_2$ under controlled conditions. The solid $CO_2$ sorbent materials may comprise solid ion exchange resins such as described in U.S. Pat. Nos. 6,503,957 and 6,716,888, as well as solid $CO_2$ sorbents or "getters" such as strong base Type 1 and Type 2 functionality ion exchange materials as are available commercially from a variety of vendors including Dow, Dupont and Rohm and Haas.

A mixture of the polymerizable monomer or monomer blend or polymer and the solid $CO_2$ sorbent material is mixed with the solid sorbent materials and liquid carrier, and applied in a solvent casting method. The monomer or monomer blend or polymer is dissolved and the solid $CO_2$ sorbent materials particles are homogeneously dispersed in the liquid carrier.

When the mixture is poured on a flat surface, e.g., a stainless steel block on a hot plate, and the liquid carrier evaporated, a sheet or film having the particles dispersed throughout is left on the surface. However in this method the structure of the sheet is determined by the interactions among the liquid carrier, the monomer or monomer blend and the particles.

In one experiment we made a sheet by mixing poly(vinylidene fluoride) and resin particles in dimethylformamid (DMF). The ion-exchange resin is ground or chopped to particle size of 100 to 1000 microns, preferably 200 to 500 microns. The resin particles should comprise 10 to 90 volume percent of the cast film, preferably 20 to 80 volume percent. The finished sheet preferably has a thickness of 0.1 to 2.0 mm, preferably 0.2 to 1.0 mm. Experiments showed that without glycerin addition the sheet with even 50% resin content is still hydrophobic, which indicates the particle agglomerations are separated by polymer. When glycerin or phenolphthalene is added into the monomer, filler and liquid carrier mixture, the sheets formed are hydrophilic and ion-conductive. FIG. 2 is an $CO_2$ absorption curve of both membranes under similar conditions.

A second method of fabrication of polymer membranes is the phase inversion/immersion precipitation method. Phase inversion methods are described generally in U.S. Pat. Nos. 3,876,738, 4,340,480, 4,770,777, and 5,215,662, all of which are incorporated herein by reference. Generally, the process is to immerse a polymer solution made by a polymer dissolved in a solvent or mixture of solvents into a miscible non-solvent such as water (i.e., a liquid in which the polymer is not soluble, but the non-solvent is miscible with the solvent). In a non-solvent such as a water bath, the polymer starts to solidify because of the penetration of water molecules whereas the solvent component diffuses into the water, leaving spaces throughout the polymer where the solvent formerly was. Thus the formed membrane is asymmetric. The surface of the membrane has a relatively dense gel surface, while the bulk interior of the membrane is relatively porous. Spaces formed by this method are interconnecting, however. The phase inversion technique has been established for about twenty years. Reverse osmosis and nanofiltration membranes are also made using this technique. It is also applied in hollow fiber membranes for pervaporation separation of ethanol/water solutions or gas separations. In our application the porous structure enables the easy access of air to the resins embedded in the polymer matrix.

A third method of fabrication of polymer membranes is the sorption method in which a mixture of liquid monomers and initiators are absorbed in a woven or non-woven fiber matrix of polypropylene, PVC, polyester, cellulose etc. The monomers polymerize under thermal or radiation conditions forming a thin layer on the matrix surface. Mizutani, Y., *Journal of Membrane Science*, 1990, 49, 121-144 reported the preparation of an ion exchange membrane using the paste method, in which the paste, consisting of monomers and finely powdered PVC was coated onto PVC cloth and the cloth was exposed to heat. Later Choi et. al. published papers describing the making of ion exchange membranes by the sorption method, in which monomers were absorbed in non-porous reinforcing materials such as polypropylene, or PVC films. Choi, Y., et al., *Desalination*, 2002, 146, 287-291; Choi, Y. et al., *Journal of Membrane Science*, 2003, 221, 219-231; Choi, Y., et al., *Journal of Membrane Science*, 2003, 223, 201-215. The nonporous reinforcing material was swollen while monomers were absorbed in non-porous reinforcing materials. The swollen reinforcing material permitted enlarged free volume for the adsorbed monomers. The membrane was treated with UV radiation for monomer polymerization (anion exchange membranes). In our experiments solutions of monomers such as vinylbenzyl chloride, styrene, divinylbenzene and the initiator benzoyl peroxide were absorbed into non porous or porous fabrics such as filter paper, polyester/cellulose paper, cloth etc, or porous film such as porous alumina, polycarbonate etc. through capillary action. The solution-saturated fabrics were then exposed to heat or radiation to polymerize the monomers. The resulting membranes in carbonate form showed moisture swing effects in absorbing $CO_2$ from the atmosphere.

Materials and Methods.

The following protocols or material preparation processes recur throughout the Examples, and so they are presented here for purposes of streamlining the disclosure of the various embodiments.

1) Amination protocol. Synthetic membranes were soaked in a 40% aqueous solution of trimethylamine for 10 hours at 50° C. They were then rinsed with tap water, and placed twice in 100 ml 0.1M HCl solution to neutralize any residual unbound trimethylamine. At this point the counterion on the membrane is chloride, and the chloride was exchanged with carbonate via the carbonation process (see below).

Carbonation protocol. Samples in the chloride form are exchanged with carbonate counterion by immersing them in 0.5 M $Na_2CO_3$ with stirring for 30 minutes twice at room temperature, and then rinsing with DI water until neutral.

Polymer loading capacity. A supporting matrix should be chemically and mechanically stable through all polymerization and derivatization processes and should be loaded with the highest amount of coated polymers. We define "loading capacity of a matrix" as (weight of net polymers coated on matrix)/(weight of net matrix).

Ion exchange capacity measurement process. Sample membranes made hereunder had their Ion Exchange Capacity ("IEC") measured to test their efficiency of $CO_2$ adsorption. IEC is defined as the total amount of ion groups per unit mass of dry material (mmol/g). The higher the IEC number the higher the corresponding $CO_2$ absorption capacity. Generally, samples were heated in an oven at about 60° C. until dry (no more weight loss). About 1.0 g of dried sample was weighed and soaked in 20 ml 0.5M $NaNO_3$ solution for 30 minutes with stirring. The sample was filtered and soaked in another fresh 20 ml 0.5M $NaNO_3$ solution for another 30 min. with stirring. All filtered solutions were collected and were titrated to pH 7 with 0.1M standard HCl solution. The total ionic numbers could be deduced from the titration results and IEC could be calculated as a ratio: total ionic number (mmols)/dried sample weight (grams).

$CO_2/H_2O$ measurement process. FIG. 2 is a schematic of the $CO_2/H_2O$ vapor measurement device used in this investigation. In order to compare samples created hereunder against the Snowpure® standard material accurately in terms of their $CO_2$ adsorption ability, the same or similar weight of samples or Snowpure® were sealed in a container (glass jar, 0.25 liter) with two vents. In order to dry or hydrate the membranes, air (absolute humidity ~5 ppt) or air saturated with moisture vapor (absolute humidity ~30 ppt) was pumped into and through the container at a fixed flow rate (usually 0.1 L/min) at 75° F. and was passed through the glass jar containing the sample material. The exiting air is then directed through an IRGA (IR Gas Analyzer, Model LI-840, LI-COR, Inc.), which detects $CO_2$ and $H_2O$ vapor content at selected intervals, usually every 10 seconds. The air is then vented to atmosphere.

Phase inversion method. Materials: DMF (dimethyl formamide) solvent (95%); PSU (polysulfone) pellets (Aldrich, P/N 428302, Mw~35,000); PVDF powder (poly(vinylidene fluoride), Aldrich, P/N 182702, Mw~534,000); PVP (Polyvinylpyrrolidone, Sigma-Aldrich, Mw~10,000); PVDF-HFP (poly(vinylidene fluoride-co-hexafluoropropylene) and Dowex® Marathon A anion exchange resin Cl form (SigmaAldrich, P/N 433942). Resin beads were ball milled to 40~100 microns at room temperature before use. Polymer matrix materials that may be used herein include but are not limited to polybisphenol-A-carbonate, poly(ethylene terephthalate), polystyrene, poly(methyl methacrylate), poly(vinyl acetate), poly(vinyl chloride), polytetrafluoroethylene, polysulfone, polyether sulfone, poly(vinylidene fluoride), styrene/butyl acrylate/methacrylic acid terpolymer, and poly (vinylidene fluoride-co-hexafluoropropylene). Preferred organic solvents for the polymers may be selected from dimethylformamide or tetrahydrofuran, or N-methylpyrrolidone (NMP). Glycerin, polyvinyl pyrolidone (PVP), dibutylphthalate (DBP), phenolphthalene or other plasticizers may be added to the mixture. For the phase inversion procedure, the aqueous-based solution may be water or methanol, ethanol, isopropanol or mixtures thereof. The resin particles used in the composite membranes may vary in diameter from 10~100 micrometer and the resin content may vary from 20~80% of polymer matrix by weight, preferably 30~60%. The final heterogeneous membrane thickness may vary from 0.1~1.0 mm, preferably 0.5 mm.

Example I

Phase Immersion of PSU-Resin Membrane

PSU-resin membrane: 0.5 g of PSU pellets were weighed in a 20 ml vial, 2.5 ml of DMF was added into the vial and the mixture was stirred until the polymer dissolved in the DMF. In another vial 0.5 g of ground ion-exchange resin powders were weighed and 2.0 ml of DMF was added. The mixture was stirred until homogeneous. The two vial contents were combined and stirred for another half hour. The mixture was cast on a rectangular 6×4 inch stainless steel block surface on a hot plate maintained at 50° C. In about 10 minutes the membrane completely gelled (the membrane looked transparent at this time and there was no liquid solvent on the surface). The block was removed from the hot plate, allowed to cool to room temperature and then soaked in a deionized water bath (2 liters). After several minutes, the membrane was peeled from the block. The membrane was left in the water bath with stirring for two days (the water in the bath was changed after one day) and boiled in hot water for 1 hour to get rid of any residual solvent inside the membrane. The membranes are then carbonated by the general carbonation protocol.

Figure 4:
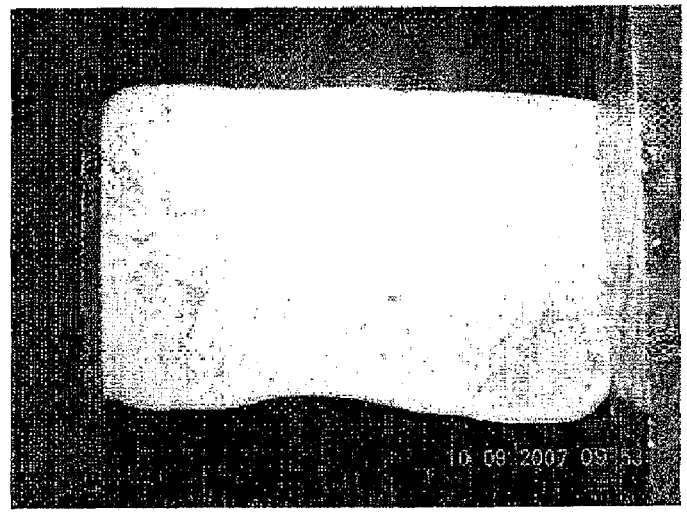
FIG. 4 shows the PSU-resin membrane after the final membrane formation.

FIGS. 3 and 4 show the PSU-resin membrane before gelling and after the final membrane formation, respectively. The IRGA measures the air that has contacted the membrane, and thus reflects the membrane's $CO_2$ adsorption capacity in real time. Snowpure® membranes are used as the standard $CO_2$ absorbent material against which the inventive membranes described herein are compared against.

Figure 5:
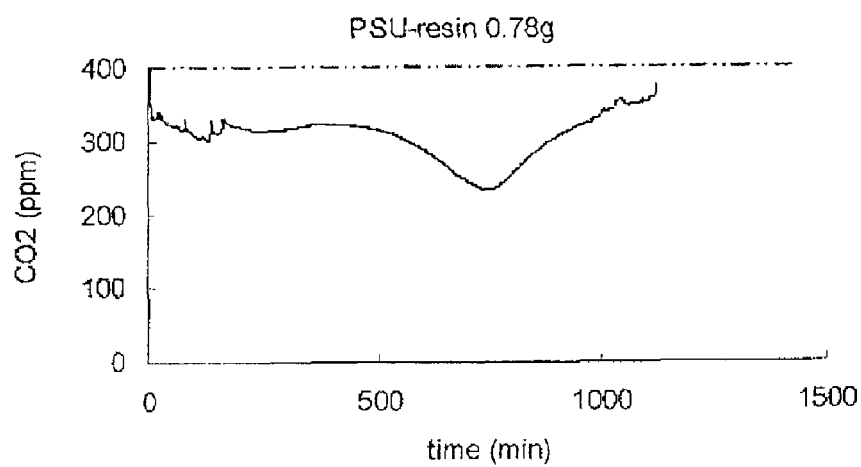
FIG. 5 is a graph showing the $CO_2$ adsorption capacity or desorption kinetics of a 0.78 gram sample of a PSU-resin composite membrane. Adsorption capacity of a sample in the chamber can be estimated from the area between the horizontal dashed line representing the atmospheric concentration of $CO_2$ (~400 ppm), and the adsorption curve, which shows the amount of $CO_2$ being adsorbed by the membranes as the 400 ppm $CO_2$ air goes through the chamber.
Figure 6:
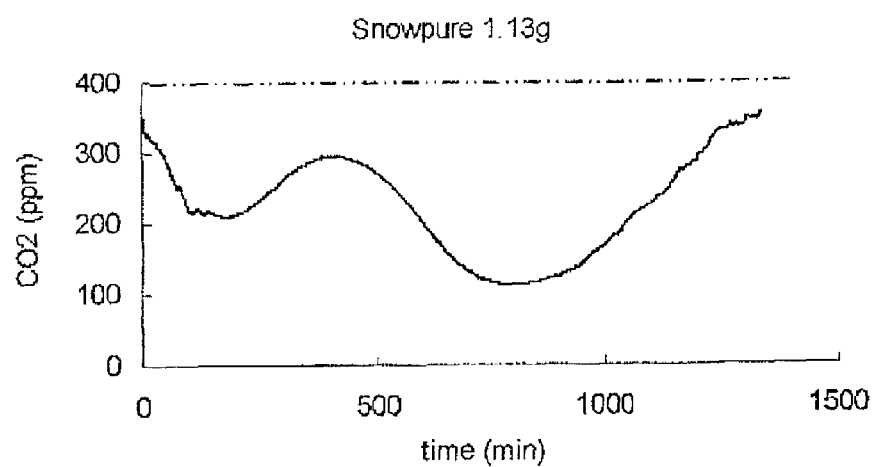
FIG. 6 is another graph of $CO_2$ versus time showing a $CO_2$ adsorption of the reference membrane Snowpure, 1.13 g.

Results:

With respect to FIG. 5 and FIG. 6, the $CO_2$ adsorption capacity of a given membrane in the chamber can be estimated from the area between the horizontal dashed line representing the atmospheric concentration of $CO_2$ (~400 ppm), and the adsorption curves, which show the amount of $CO_2$ being adsorbed by the membranes as the 400 ppm $CO_2$ air goes through the chamber. Simply, we can cut the areas and measure paper weight. The ratio of paper weights between the membranes being compared is directly proportional to $CO_2$ capacity if the sample weights are similar. This is also known as the integral of the area under the 400 ppm curve and above the $CO_2$ adsorption curve.

From FIGS. 5 and 6, the CO2 capacity of the PSU membrane is smaller than that of the Snowpure sample (absorption area per unit weight of PSU is smaller than that of Snowpure). Theoretically with the same amount of resin the membranes should absorb the same quantity of $CO_2$. One possible reason for the lower $CO_2$ absorption by the PVDF- and the PSU-resin-$CO_3$ membranes compared to the Snowpure® membranes is that the resin particles are more tightly surrounded by polypropylene polymer. One way to resolve this is to make the membranes more porous. In the following experiment we added PVP (polyvinylpyrrolidone) into the mixture before casting. PVP is soluble in both polar aprotic solvent and water. After the membrane is cast and later soaked in water, the PVP mixed with the water and left pores inside the membrane.

Example II

Phase Inversion Aided by PVP

Membrane (PSUPVP) preparation: 0.5 g of PSU was weighed in a 20 ml vial and 2.5 ml DMF was added and the mixture stirred until all polymers were dissolved. 0.5 g of resin and 0.2 g of PVP was weighed in another vial and 2.5 ml DMF was added. The mixture was stirred until homogeneous. The two vial contents were combined and stirred for another 0.5 hour at room temperature. The mixture was cast on the same rectangular stainless steel block surface, 6×4 inches on a hot plate at 50° C. After about 10 minutes, the membrane completely gelled (the whole membrane appears transparent at this time and there was no flowing solvent on the surface). The block was removed from the hot plate, allowed to cool to room temperature, and then soaked in a deionized water bath. After several minutes, the membrane was peeled from the block. The membrane then was left in the water bath with stirring for two days (the water in bath was changed after one day) and boiled in hot water for 1 hour to eliminate the solvent and any PVP inside the membrane. The membrane was then carbonated according to the standard protocol.

Figure 7:
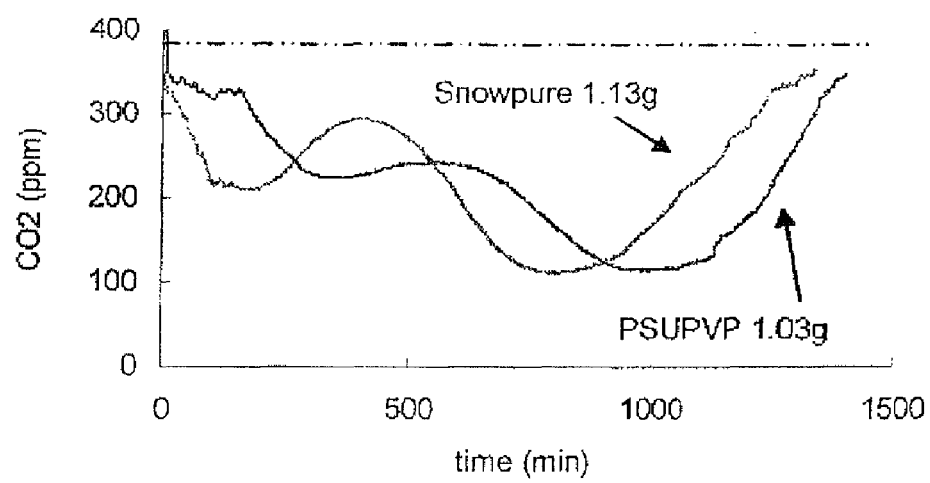
FIG. 7 is a graph of $CO_2$ versus time showing the $CO_2$ adsorption capacity of two membranes, the Snowpure 1.13 g reference membrane, and a PSU PVP 1.03 g membrane.

Results:

From FIG. 7 the CO2 adsorption capacity of PSUPVP membrane is much bigger than that of the PSU membrane in Experiment I, which indicates that the addition of PVP increases membrane porosity. The IEC value is 1.90 mmol/g. A comparison was made of the $CO_2$ adsorption for this PSUPVP membrane to the membrane material from Snowpure® (FIG. 7) which also has an IEC value of 1.9. Numerical estimates of the $CO_2$ uptake for the Snowpure material and PSUPVP membrane based on the integral of the $CO_2$ deficit in the exhaust stream suggest that the total uptake capacities are quite similar. We conclude that the PSUPVP membrane has comparable $CO_2$ absorption capacity to the Snowpure®.

Except for PSU polymer, other thermal plastic polymers could also be used as matrix via phase immersion process.

Example III

Phase Immersion of PVDF-HFP Membrane

Membrane (PVDF-HFP) preparation: 0.5 g of PVDF-HFP were weighed in a 20 ml vial and 3.0 ml DMF was added and the mixture stirred until all polymers were dissolved. 0.5 g of resin was weighed in another vial and 2.0 ml DMF was added. The mixture was stirred until homogeneous. The two vial contents were combined and stirred for another 0.5 hour at room temperature. The mixture was cast on the same rectangular stainless steel block surface, 6×4 inches, on a hot plate at 50° C. After about 10 minutes, the membrane completely gelled (the whole membrane appears transparent at this time and there was no flowing solvent on the surface). The block was removed from the hot plate, allowed to cool to room temperature, and then soaked in a deionized water bath. After several minutes, the membrane was peeled from the block. The membrane then was left in the water bath with stirring for two days (the water in bath was changed after one day) and boiled in hot water for 1 hour to eliminate the solvent and any remaining PVP inside the membrane. The membrane was then carbonated according to the standard protocol.

Figure 8:
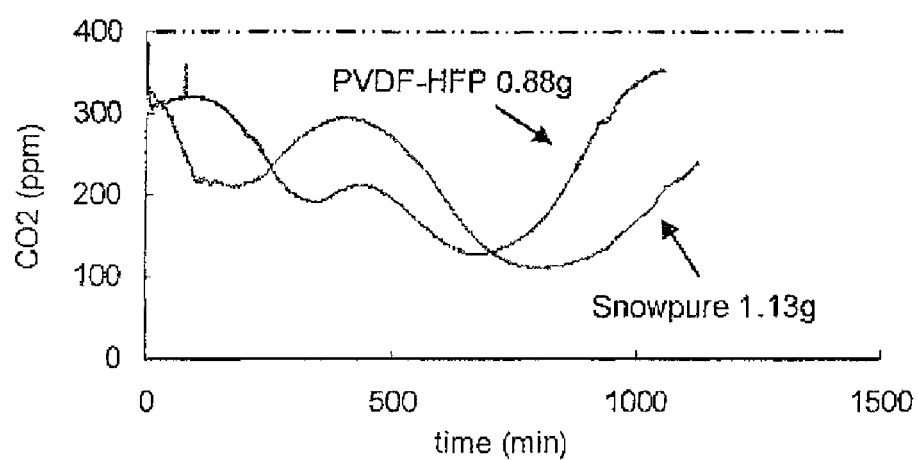
FIG. 8 is a graph of $CO_2$ versus time showing the $CO_2$ adsorption capacity of two membranes, the same Snowpure reference membrane plotted with a PVDF-HFP 0.88 g membrane.
Figure 9:
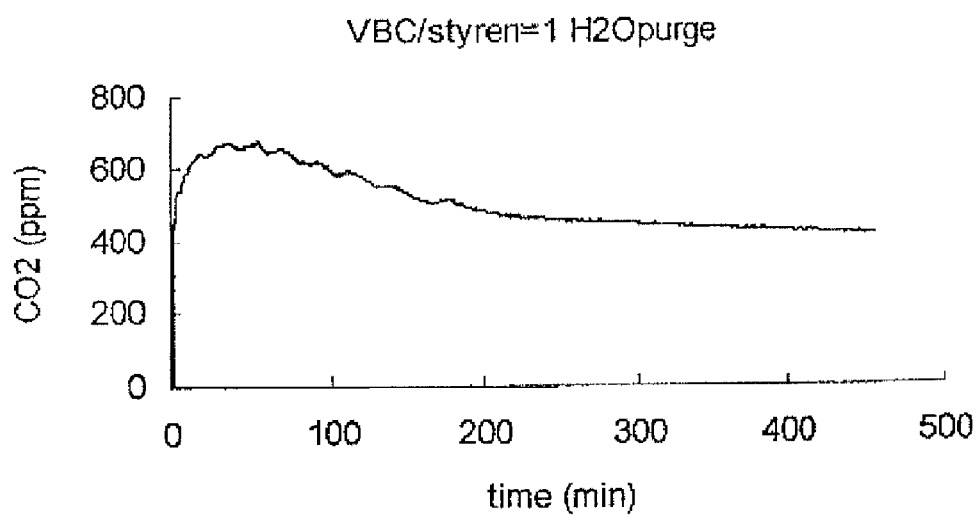
FIG. 9 is a graph of $CO_2$ versus time showing the $CO_2$ desorption pattern that occurs when air saturated with water vapor is purged through the chamber.

Results: PVDF-HFP membrane shows comparable CO2 absorption ability of Snowpure in FIG. 8 with no addition of PVP. This membrane has a IEC of 1.85.

B. Sorption Method

In the following embodiments solutions of monomers such as vinylbenzyl chloride, styrene, divinylbenzene and the polymerization initiator benzoyl peroxide were absorbed into non-porous fabrics such as filter paper, polyester/cellulose paper, cloth, etc, or porous film such as porous alumina, polycarbonate film, etc. through capillary action. The solution-saturated fabrics were then exposed to heat or radiation to polymerize the monomers. The resulting membranes in carbonated form showed moisture swing effects in absorbing and de-sorbing $CO_2$ from the atmosphere.

Reagents:

Vinyl benzyl chloride (VBC, Aldrich, 97%), Styrene (Sigma-Aldrich, 99%), Divinyl benzene (Aldrich, 80%) and Benzoic acid (Fltika, 99%) were all dried by passing them through an $Al_2O_3$ column and stored at 0° C. and purified by recrystalization. Benzoyl peroxide (powder) in a beaker was dissolved in a minimum amount of chloroform. The solution was transferred into a separation funnel. The solution was separated into two layers. The water layer was on top and bottom layer was BP-chloroform solution. The bottom layer was collected in a clean beaker and methanol was added until no more precipitation occurred. The solvent was decanted and white precipitate was purged under $N_2$ and stored in a desiccator.

Example IV

Membranes Synthesized from Polyester/Cellulose Matrixes 1.5 ml VBC, 1.5 ml styrene, 0.3 ml divinylbenzene and 0.02 g BP were added into a 20 ml vial and were stirred until all BP was dissolved at room temperature. The mixed solution was poured onto Durx® 670 polyester/cellulose papers and was spread on the paper under capillary effect. The wet papers were put in a closed glass container and were purged with $N_2$ to eliminate residual $O_2$ in the container. The container was placed in an oil bath and heated to about 68~70° C. for 10 hours. After reaction completion, the container was cooled to room temperature and was left open for 2~3 hours to evaporate excess reagents. The membranes were soaked in 40% trimethylamine aqueous solution for 3 hours at 30° C. to aminate them and then were rinsed with tap water. The aminated membranes were soaked in 2×100 ml 0.1M HCl solution to wash off any excess trimethylamine, and then rinsed with tap water. Finally the membrane was carbonated by soaking in 0.5 M $Na_2CO_3$ 2×100 ml. The final product was rinsed with water until neutral before use.

VBC was the reagent utilized to enable the subsequent addition of functional amine groups via amination to the final product. Para- or ortho-VBC, or mixtures of both, function adequately. Styrene was the non-functional matrix polymer that increased hydrophobicity of the membrane. Divinyl benzene was the cross-linking reagent, and BP was the initiator for the polymerization reaction. The VBC and styrene ratio could be changed from 100% VBC to 10% VBC, according to product requirements. The cross-linking percentage could be changed from 2% to 20% of total VBC and styrene weight. Reaction vessels can be made from glass, stainless steel or ceramic.

Membrane $CO_2$ Binding Performance:

For membrane measurements of $CO_2$ adsorption capacity, samples were sealed in the 250 ml glass jar mentioned previously and were purged with air at 0.1 L/min flow rate. The measurement protocol was described previously. FIGS. 9-12 are measured from a single sample weighing 3.5 g having an IEC of 0.55 mmol/g.

Figure 10:
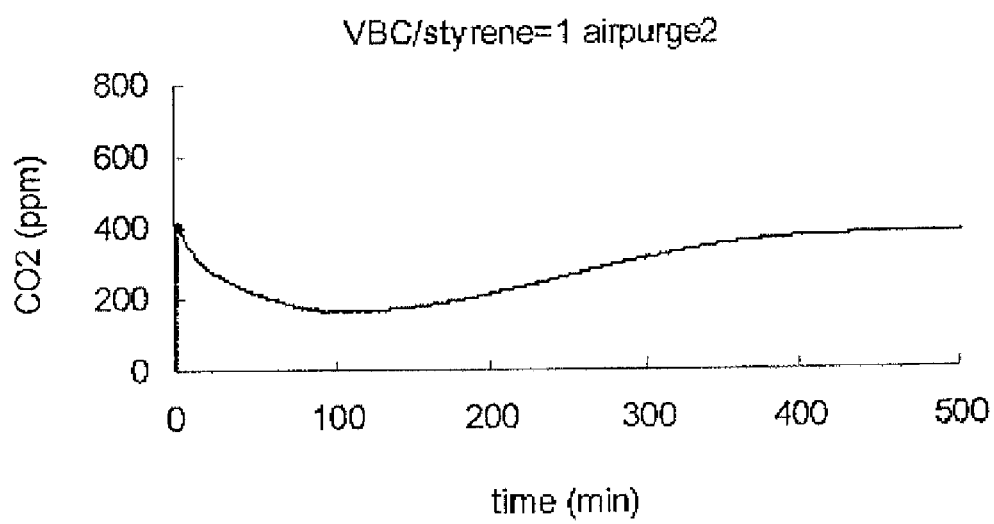
FIG. 10 is a graph of $CO_2$ versus time showing the VBC/styrene ratio equal to one as air is purged through it to dry the membrane.
Figure 11:
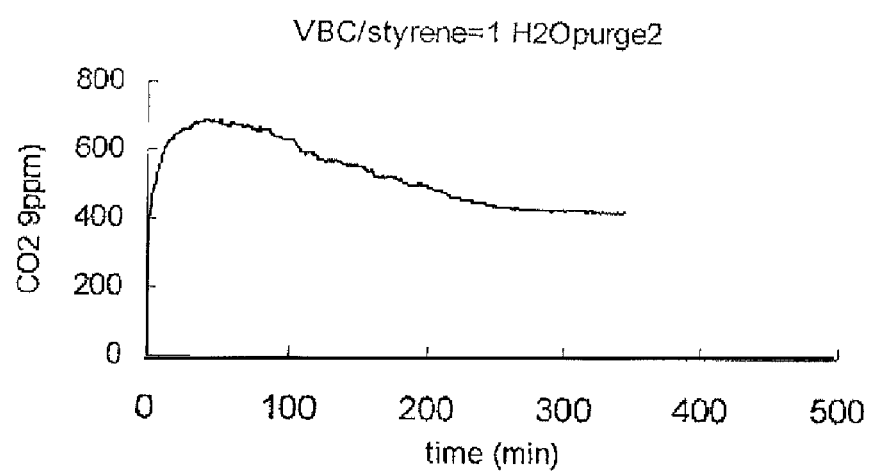
FIG. 11 is a graph of $CO_2$ versus time for the membrane and VBC\styrene equal to one with a water vapor purge through the chamber.
Figure 12:
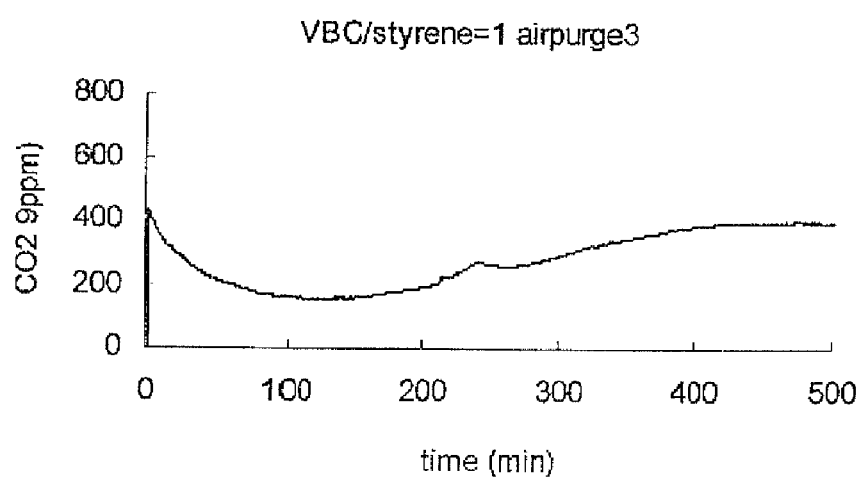
FIG. 12 is a graph of $CO_2$ versus time for the VBC/styrene ratio equal to one air purge of the membrane in the chamber.

In FIGS. 9-12, the 3.4 g sample was purged by dry air (FIG. 9) followed by moisture saturated air (FIG. 10). The process was repeated once (FIGS. 11-12). With atmospheric $CO_2$ levels at about the 390 ppm level, the sample showed a repeatable "moisture swing" CO2 adsorption/desorption effect: when the membrane sample was purged by relatively dry air (absolute humidity ~5 ppt), the membrane adsorbed $CO_2$; when the sample was purged with moisturized air (absolute humidity 30 ppt), it gave off or desorbed $CO_2$.

In FIGS. 9-12, during sample preparation the VBC to styrene ratio was 1. Under the same reaction conditions but varying the VBC to styrene ratio, it is expected to help increase the membrane's $CO_2$ absorption capacity, as shown by the following example.

Example V

Figure 13:
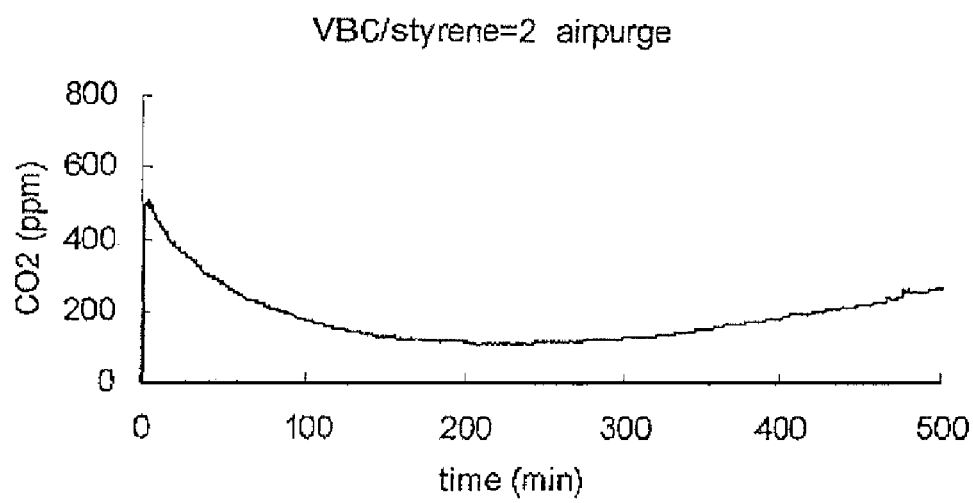
FIG. 13 is a graph of $CO_2$ versus time showing the behavior of the sample VBC/styrene ratio equal to two when air is purged through the chamber containing the sample membrane.
Figure 14:
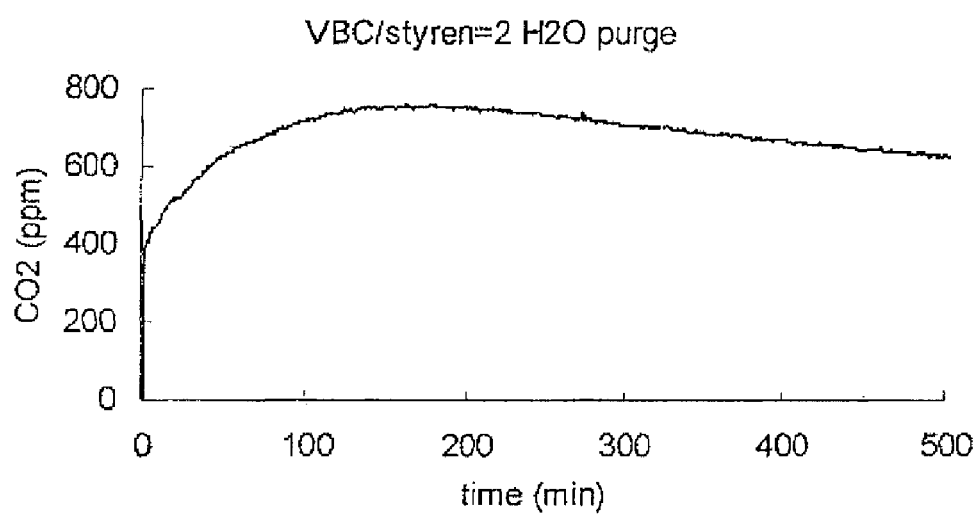
FIG. 14 is a graph of $CO_2$ versus time for the VBC/styrene ratio equal to two sample membrane with a high humidity air purge.

Membranes Synthesized from Polyester/Cellulose Matrixes-Effect of Increase in VBC Content In this experiment samples were made under the same conditions as in experiment IV except that VBC and styrene were present at a 2:1 ratio respectively. The sample weights in FIGS. 13-14 are 4.1 g. IEC is 1.35 mmol/g, which is significantly higher than the 1:1 ratio's 0.55 mmol/g.

In experiment V the samples were made with a higher VBC to styrene ratio (VBC/styrene=2) compared with samples made in experiment IV (VBC/styrene=1). FIGS. 13 and 14 demonstrate that the increased amount of VBC may have provided more ionic sites on the membrane thereby increasing the membrane's CO2 adsorption capacity. The resulting membranes show retention of the moisture swing effect.

When the amount of VBC was increased to 100%, the resulting samples did not show enhanced performance. IEC titration of the sample with VBC only and the sample with VBC/styrene=1 both resulted in an IEC of 1.0 mmol/g of dry sample, much lower than the IEC of Snowpure® (1.9 mmol/g). The following method is to conduct amination at elevated temperature (from 30° C. to 50° C.) and extended reaction time (from 3 hrs to 10 hrs).

Example VI

Membranes Synthesized From Polyester/Cellulose Matrixes-Improved Amination Condition 3.0 ml ml VBC, 0.45 ml divinylbenzene and 0.02 g BP were added into a 20 ml vial and were stirred until all BP was dissolved at room temperature. The mixed solution was poured onto Durx® 670 polyester/cellulose papers and was distributed through the paper by the capillary effect. The wet papers were put in a closed glass container and were purged with $N_2$ to eliminate residual $O_2$ in the container. The container was placed in an oil bath and heated to about 68~70° C. for 10 hours. After reaction completion, the container was cooled to room temperature and was left open for 2~3 hours to evaporate excess reagents. Instead of aminating at 30° C. for 3 hours, the membranes were soaked in 40% trimethylamine aqueous solution for 10 hours at 50° C. and then were rinsed with tap water. The aminated membranes were soaked 2× in 100 ml 0.1M HCl solution to wash off any excess trimethylamine, and then rinsed with tap water. Finally the membrane was carbonated by soaking in 0.5 M $Na_2CO_3$ 2×100 ml. The final product was rinsed with water until neutral before use.

Sample membranes or Snowpure® membranes were sealed in a container (glass jar, 0.25 liter) with two vents. Dry air (atmospheric air passed through dry silica column, absolute humidity ~0 ppt) was pumped into the container at a fixed flow rate (0.1 L/min) at 75° F. and was purged through the sample. The exiting air is then directed through an IRGA (IR Gas Analyzer, Model LI-840, LI-COR, Inc.), which detects $CO_2$ and $H_2O$ vapor content at every 10 seconds. The air is then vented to atmosphere.

Figure 15:
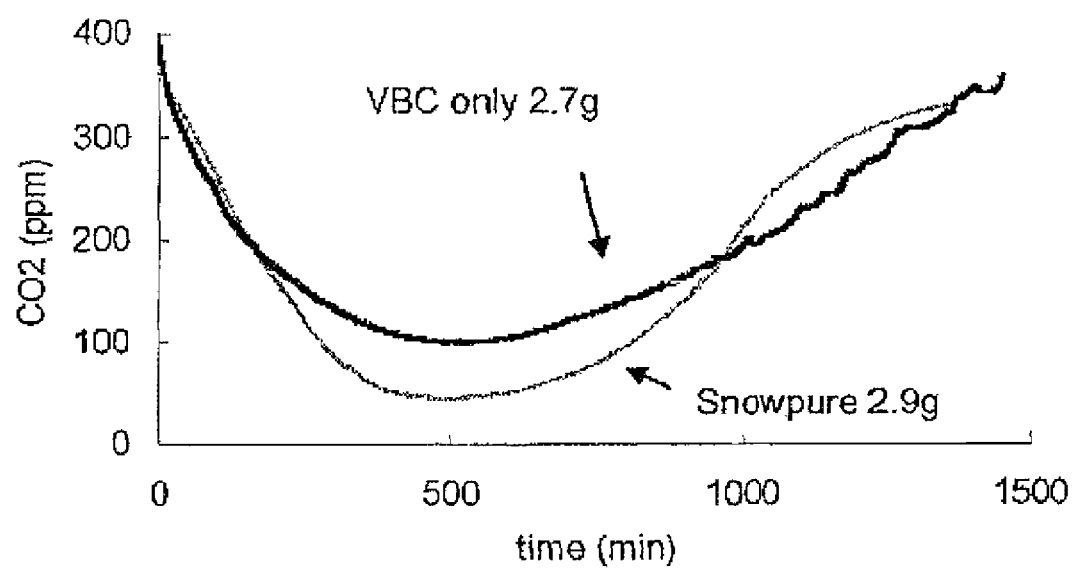
FIG. 15 is a graph of $CO_2$ versus time for her the membranes and VBC only, 2.7 g, and the snow pure 2.9 Graeme membrane.

FIG. 15 showed that samples made under improved amination conditions had similar CO2 absorption capacity compared with Snowpure®. IEC titration of samples was 2.2 mmol/g, a bit higher than that of Snowpure® (1.9 mmol/g).

In the above coating method, the matrix we used was polyester/cellulose fabric. This coating method could also be applied to fibers such as polyester thread, nylon thread, polyester/cotton thread etc.

Example VII

Polyester/Cotton Thread Synthesized by Sorption Method 3.0 ml VBC, 0.45 ml divinylbenzene and 0.02 g BP were added into a 20 ml vial and were stirred until all BP was dissolved at room temperature. The mixed solution was dropped onto polyester/cotton thread (sewing thread, 37% cotton, 63% polyester) and was spread along thread under capillary effect. The wet threads were put in a closed glass container and were purged with $N_2$ to eliminate residual $O_2$ in the container. The container was placed in an oil bath and heated to about 68~70° C. for 10 hours. After reaction completion, the container was cooled to room temperature and was left open for 2~3 hours to evaporate excess reagents. The threads were soaked in 40% trimethylamine aqueous solution for 10 hours at 50° C. to aminate them and then were rinsed with tap water. The aminated threads were soaked in 2×100 ml 0.1M HCl solution to wash off any excess trimethylamine, and then rinsed with tap water. Finally the threads were carbonated by soaking in 0.5 M $Na_2CO_3$ 2×100 ml. The final product was rinsed with water until neutral before use.

Figure 16:
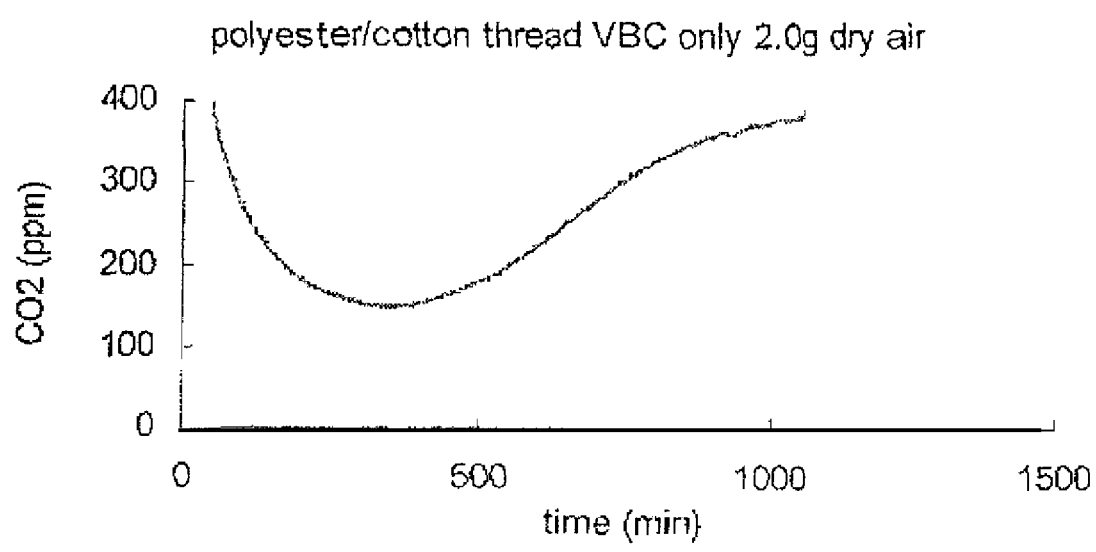
FIG. 16 is a graph of $CO_2$ concentration versus time for the sample polyester/cotton thread VBC only, 2.0 g, with a dry air purge.

The IEC of the coated polyester/cotton thread shown in FIG. 16 is 1.5 meq/g, which is a relatively lower IEC compared with that of Snowpure® (1.9 meq/g) and is from the thread having a lower polymer loading capacity defined in Protocol 3.

The loading capacity of sample matrixes were measured according to Protocol 3 and used the following matrices: braided nylon thread: 0.5; polyester/cotton thread: 0.85; polyester thread: 0.89 polyester/cellulose fabric: 2.0. The fabrics or fibers such as polyester/cellulose paper, polyester thread, polyester/cotton thread etc. proved to be good matrices. Light weight and high absorption material is optimal.

The methods described above, and other conceivable methods, may be used to form various superstructures having active resins embedded therein. For example, it is possible using the solid sorbents and polymers or other matrices discussed above to form films that can be arranged in the configurations described in co-pending application PCT Application Serial No. PCT/US08/60672, which describes several geometries that may be used to form a collapsible collector to optimize the porosity of the collector for alternating liquid and gas streams. The films may be formed in flat membranes, concentric cylinders or tubes, or wound up spirals. Some configurations may require the use of spacers, which may be formed of a polymer material, to form the structure.

Other examples of superstructures that are possible using the present invention include the formation of flat membranes, tubes, hexagons, or monolithic structures, using porous materials. Porous structures will naturally increase the amount of surface area for $CO_2$ uptake. Alternatively, the solid sorbent material may be produced in a foam that can be manipulated into complex shapes for a specific application or for optimal performance. In another alternative formation, the material could be spun into thin threads or woven into textile or felt-like materials.

The sorbent materials of the present disclosure may also be applied as surface coating to an underlying structure formed of a durable and inexpensive material. For example, monoliths made out of inexpensive materials could be soaked in the polymer/resin combination and then harden into a useful filter system. These monoliths may be constructed of paper materials, ceramic materials, textiles, or other appropriate materials. The coatings may be applied similar to a paint, such as by spraying, rolling, dipping, or the like.

In another aspect of the present invention, the superstructure may be formed as the sorbent materials are polymerized around a fibrous structure, similar to a carbon composite matrix structure.

The present invention may also be used to create a sorbent superstructure with very rough surfaces, which would then increase the uptake rate of the $CO_2$ capture process. In particular, solvents may be used to form a dendritic structure. A rough surface could also be accomplished by a method involving a step of etching the solid material to create more surface area.

In embodiments where a high concentration of uptake sites are present, it may be possible to use turbulent flows through the filter, as this would decrease the air side transport limitations of the system.

Various changes may be made without departing from the spirit and cope of the invention. For example, $CO_2$ capture elements may be formed using solid amines as the $CO_2$ sorbent or getter. The solid amine getters preferably are the amines as described in our co-pending U.S. Provisional Application Ser. No. 60/989,405, filed Nov. 20, 2007. The solid amines may be formed on porous solid supports, membranes or films, e.g. from liquid amines which are dried in place on a support. Also, the membranes and films may be formed by roll casting, or doctor blade casting from a solution containing the monomer or monomer blend or polymer dissolved or a solvent containing the particulate $CO_2$ sorbent or getter. Also, films, membranes or fibers may be formed by spin coating.

What is claimed is:

1. A method for the capture of $CO_2$ from air, comprising capturing $CO_2$ from atmospheric air with a solid capture material, and treating said solid capture material to release captured $CO_2$; wherein said solid capture material (i) comprises a $CO_2$ sorbent material comprising a polymer immobilized in or on a porous support material; and (ii) has a $CO_2$ adsorption capacity higher than 1.9 mmol/g.

2. The method of claim 1, wherein said solid capture material comprises a polymer selected from the group consisting of: polybisphenol-A-carbonate, poly(ethylene terephthalate), polystyrene, poly(methyl methacrylate), poly(vinyl acetate), poly(vinyl chloride), polytetrafluoroethylene, polysulfone, polyether sulfone, poly(vinylidene fluoride), styrene/butyl acrylate/methacrylic acid terpolymer, and poly(vinylidene fluoride-cohexafluoropropylene).

3. The method of claim 1, wherein said solid capture material is formed using a $CO_2$ sorbent comprising particles having a diameter between 10-1000 micrometers.

4. The method of claim 1, wherein the $CO_2$ sorbent material content of said solid capture material is 20% to 80% by weight.

5. The method of claim 1, further comprising releasing $CO_2$ captured by said solid capture material by hydrating said solid capture material.

6. The method of claim 1, wherein said solid capture material releases $CO_2$ when hydrated.

7. The method of claim 1, wherein said $CO_2$ sorbent material comprises an ion exchange resin.

8. The method of claim 7, wherein said ion exchange resin comprises a Type I or Type II functionality ion exchange resin.

9. The method of claim 1, wherein said $CO_2$ sorbent material comprises polysulfone, poly(vinylidene fluoride-co-hexafluoropropylene), or vinyl benzyl chloride.

* * * * *